United States Patent
Bacallao et al.

(10) Patent No.: US 10,281,083 B2
(45) Date of Patent: May 7, 2019

(54) MOBILE COMPUTING DEVICE HOLDER

(71) Applicant: Walmart Apollo, LLC, Bentonville, AR (US)

(72) Inventors: Yurgis Mauro Bacallao, Centerton, AR (US); Stephen Tyler Caution, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 26 days.

(21) Appl. No.: 15/602,227

(22) Filed: May 23, 2017

(65) Prior Publication Data

US 2017/0347780 A1    Dec. 7, 2017

Related U.S. Application Data

(63) Continuation-in-part of application No. 29/566,596, filed on Jun. 1, 2016.
(Continued)

(51) Int. Cl.
*G06F 1/16* (2006.01)
*A47B 97/00* (2006.01)
(Continued)

(52) U.S. Cl.
CPC ............. *F16M 13/02* (2013.01); *A47B 97/00* (2013.01); *E05B 73/00* (2013.01);
(Continued)

(58) Field of Classification Search
CPC ........ F16M 13/02; F16M 11/04; F16M 11/06; G06F 1/1632; H04B 1/3877; A47B 97/00;
(Continued)

(56) References Cited

U.S. PATENT DOCUMENTS

D31,591 S    10/1899  Fox
1,681,210 A   8/1928  Banks
(Continued)

OTHER PUBLICATIONS

Notice of Allowance in U.S. Appl. No. 15/657,693 dated Jul. 6, 2018; 5 pages.
(Continued)

*Primary Examiner* — Nidhi Thaker
(74) *Attorney, Agent, or Firm* — Schmeiser, Olsen & Watts LLP

(57) ABSTRACT

A mobile computing device holder that mounts to a wall is described. The mobile computing device holder holds a mobile computing device base, such as a docking station or charger. The mobile computing device base cradles a mobile computing device such as a smart phone or scanning device. The mobile computing device holder includes a wall mount fixture that mounts to the wall and holds the mobile computing device base. A coupling apparatus is coupled to the mobile computing device so that the mobile computing device can be tethered to the wall mount fixture. The tether device tethers the mobile computing device and coupling apparatus to the wall mount fixture so the mobile computing device can be used, but cannot be moved more than the length of the tethering device from the wall mount fixture. The mobile computing device is docked in the base when not in use.

7 Claims, 19 Drawing Sheets

Related U.S. Application Data

(60) Provisional application No. 62/343,953, filed on Jun. 1, 2016, provisional application No. 62/343,954, filed on Jun. 1, 2016, provisional application No. 62/343,952, filed on Jun. 1, 2016.

(51) Int. Cl.
*E05B 73/00* (2006.01)
*F16M 11/04* (2006.01)
*F16M 11/06* (2006.01)
*F16M 13/02* (2006.01)
*H04B 1/3877* (2015.01)

(52) U.S. Cl.
CPC ......... *E05B 73/0082* (2013.01); *F16M 11/04* (2013.01); *F16M 11/06* (2013.01); *G06F 1/1632* (2013.01); *H04B 1/3877* (2013.01)

(58) Field of Classification Search
CPC .............. A47B 2097/006; E05B 73/00; E05B 73/0082
See application file for complete search history.

(56) References Cited

U.S. PATENT DOCUMENTS

| | | |
|---|---|---|
| 1,715,715 A | 6/1929 | McVey |
| 1,922,935 A | 8/1933 | Du Bois |
| 1,937,994 A | 12/1933 | Taylor |
| 2,677,520 A | 5/1954 | Marcy |
| 2,891,756 A | 6/1959 | Packard |
| 3,076,627 A | 2/1963 | Huron |
| D242,510 S | 11/1976 | Enckler |
| D254,051 S | 1/1980 | Zaleski |
| D287,817 S | 1/1987 | Henin |
| D299,809 S | 2/1989 | Hagedorn |
| D327,214 S | 6/1992 | Stuart |
| D349,640 S | 8/1994 | Whitaker |
| D357,400 S | 4/1995 | Sachs |
| 5,454,537 A | 10/1995 | Meeker |
| D379,144 S | 5/1997 | Hunter et al. |
| D397,606 S | 9/1998 | Tameling |
| D408,266 S | 4/1999 | Santiago |
| D411,098 S | 6/1999 | Vogels |
| D420,278 S | 2/2000 | Coffy et al. |
| D427,888 S | 7/2000 | Hannon |
| D432,901 S | 10/2000 | Mcdonald |
| 6,285,758 B1 | 9/2001 | Lu |
| 6,511,251 B2 | 1/2003 | Bowell |
| 6,711,921 B1* | 3/2004 | Yang .................. E05B 73/0082 248/551 |
| 6,769,750 B2 | 8/2004 | Hughes et al. |
| 6,957,978 B2 | 10/2005 | Zoller |
| D513,969 S | 1/2006 | Schurr et al. |
| D516,023 S | 2/2006 | Quinn |
| D516,394 S | 3/2006 | Chen |
| 7,154,039 B1 | 12/2006 | Marszalek et al. |
| D537,324 S | 2/2007 | Worrall et al. |
| D542,632 S | 5/2007 | Hill |
| D546,366 S | 7/2007 | Dittmer |
| 7,264,863 B2 | 9/2007 | Haymond |
| D573,008 S | 7/2008 | Sipe |
| D574,222 S | 8/2008 | Golias, Jr. et al. |
| D576,633 S | 9/2008 | Muday et al. |
| D578,816 S | 10/2008 | Goodman et al. |
| D584,553 S | 1/2009 | Goodman et al. |
| D606,384 S | 12/2009 | Antonic |
| D608,111 S | 1/2010 | Rubin |
| 7,724,520 B2* | 5/2010 | Allen .................. E05B 73/0082 211/8 |
| D631,735 S | 2/2011 | Johnson |
| D643,708 S | 8/2011 | Hecht |
| 8,077,449 B2 | 12/2011 | Mi et al. |
| 8,103,155 B2 | 1/2012 | Dannenberg et al. |
| D660,307 S | 5/2012 | Huang |
| D674,637 S | 1/2013 | London |
| 8,418,514 B1* | 4/2013 | Su ...................... E05B 73/0005 70/14 |
| 8,548,536 B1 | 10/2013 | Gunnip |
| D700,593 S | 3/2014 | Xiang |
| D705,040 S | 5/2014 | Konrad et al. |
| 8,713,858 B1 | 5/2014 | Xie |
| 8,729,852 B2 | 5/2014 | Tsai et al. |
| D711,736 S | 8/2014 | Strom et al. |
| D714,616 S | 10/2014 | Walker et al. |
| 8,869,573 B2* | 10/2014 | Myers ................. E05B 73/0005 70/58 |
| D726,174 S | 4/2015 | Wahlin |
| D729,766 S | 5/2015 | Luijben et al. |
| 9,022,337 B2 | 5/2015 | Petruskavich |
| D734,305 S | 7/2015 | Wengreen |
| 9,115,846 B2 | 8/2015 | Maier et al. |
| 9,128,668 B2 | 9/2015 | Johnson |
| 9,131,195 B2 | 9/2015 | Wengreen et al. |
| 9,165,174 B2 | 10/2015 | Huck |
| 9,179,565 B2 | 11/2015 | Cho |
| D744,317 S | 12/2015 | Densberger et al. |
| D744,459 S | 12/2015 | Cummings et al. |
| 9,272,829 B2 | 3/2016 | Wynnick et al. |
| D761,236 S | 7/2016 | Wengreen |
| D766,601 S | 9/2016 | Barre et al. |
| 9,454,917 B1 | 9/2016 | King et al. |
| D771,476 S | 11/2016 | Prince et al. |
| D774,753 S | 12/2016 | Moreau et al. |
| D774,754 S | 12/2016 | Moreau et al. |
| D776,745 S | 1/2017 | Bennett et al. |
| D776,746 S | 1/2017 | Bennett et al. |
| D795,266 S | 8/2017 | Williams |
| D796,302 S | 9/2017 | Bright et al. |
| D811,199 S | 2/2018 | Bacallao |
| 9,933,107 B2 | 4/2018 | King et al. |
| D821,850 S | 7/2018 | Tyrer |
| D829,216 S | 9/2018 | Belitz et al. |
| 10,084,499 B2 | 9/2018 | Bacallao et al. |
| D831,876 S | 10/2018 | Moon |
| 2002/0033436 A1 | 3/2002 | Peng et al. |
| 2002/0148935 A1 | 10/2002 | Chambers |
| 2003/0041631 A1* | 3/2003 | Yin ...................... E05B 73/0005 70/58 |
| 2006/0233601 A1* | 10/2006 | Crain .................. E06C 7/14 403/300 |
| 2007/0007412 A1* | 1/2007 | Wang .................. F16M 11/10 248/284.1 |
| 2007/0295870 A1* | 12/2007 | Peterson ............. F16M 11/10 248/125.7 |
| 2008/0079388 A1 | 4/2008 | Samowsky et al. |
| 2008/0169393 A1* | 7/2008 | Wang .................. B60R 11/02 248/274.1 |
| 2008/0283694 A1 | 11/2008 | VanLanen et al. |
| 2010/0039762 A1 | 2/2010 | Watson |
| 2011/0157805 A1 | 6/2011 | Mi et al. |
| 2012/0091086 A1 | 4/2012 | Gregory et al. |
| 2013/0092805 A1* | 4/2013 | Funk ................... F16M 13/02 248/121 |
| 2013/0093386 A1 | 4/2013 | Tsai et al. |
| 2013/0153720 A1 | 6/2013 | Petruskavich |
| 2013/0161054 A1 | 6/2013 | Allison et al. |
| 2013/0278050 A1 | 10/2013 | Maier et al. |
| 2013/0320163 A1 | 12/2013 | Wong |
| 2014/0028243 A1* | 1/2014 | Rayner ............... G06F 1/163 320/103 |
| 2014/0091193 A1 | 4/2014 | Simon |
| 2015/0041622 A1 | 2/2015 | Mulhern et al. |
| 2015/0070839 A1 | 3/2015 | Johnson |
| 2015/0144754 A1 | 5/2015 | Elharar |
| 2015/0201113 A1 | 7/2015 | Wood |
| 2015/0289396 A1 | 10/2015 | Hwang et al. |
| 2015/0329062 A1* | 11/2015 | Ackeret .............. B60R 11/02 248/220.22 |
| 2016/0176357 A1* | 6/2016 | Maslakow ......... F16M 13/02 224/275 |
| 2016/0204636 A1 | 7/2016 | Allen et al. |
| 2017/0058572 A1* | 3/2017 | Avganim ........... E05B 73/0082 |

(56) References Cited

U.S. PATENT DOCUMENTS

| | | | | |
|---|---|---|---|---|
| 2017/0268716 A1* | 9/2017 | Hoyda | ................ | H04M 1/0291 |
| 2017/0339937 A1 | 11/2017 | Erdmann | | |
| 2017/0347780 A1 | 12/2017 | Bacallao et al. | | |
| 2018/0197389 A1* | 7/2018 | Grant | ................ | G08B 13/1409 |
| 2018/0229093 A1 | 8/2018 | Givens | | |

OTHER PUBLICATIONS

Notice of Allowance in U.S. Appl. No. 29/572,493, dated Dec. 27, 2017; 8 pages.
Non-Final Office Action for U.S. Appl. No. 15/657,693, dated Mar. 22, 2018.
"Code Reader 2500 CR2500 512G_01 Barcode Scanner w/Charger + Handle," Ebay.com, accessed on Jun. 15, 2017; 4 pages.
"Wireless Laser Barcode Scanner Label Reader with Charger Base Handheld Barcode Scanning for Supermarket Shop," DHGate.com, accessed on Jun. 15, 2017; 3 pages.
Notice of Allowance in U.S. Appl. No. 29/566,595, dated Jun. 30, 2017; 6 pages.
Tram-browning, "L-Bracket 1255 3/4 Hole Stainless Steel NMO 3/4 Hole Mount L Bracket Mobile Antennas Motorola Kenwood Vertex HYT for UHF VHF Coam NMO Mount Cable Mobile Antennas Car Truck Hood install by tram-browning", Amazon.com, first accessed on May 27, 2016; 5 pages.
10 Units crank angle bracket plastic frame angular DIY model accessories, AliExpress.com, first accessed May 27, 2016; 12 pages.
Repe, "High Rated Brush Coating Finish Plastic Composite Railing Metal L Shape WPC Clip Accessory", TimberCompositeDecking.com, first accessed May 27, 2016; 2 pages.
Product Photos, DeckMaster.com, first accessed May 27, 2016; 10 pages.
Profis, Sharon, "How to mount your smartphone on a tripod (DIY)", CNET.com, Mar. 26, 2014; 5 pages.
VGaurd, "vG-SDM003 Square Security Display Magnetic Mounting Holder for Cell Phone", WelGaurd.com, first accessed on May 27, 2016; 7 pages.
VGuard, "vG-SDM001 Small Oval Security Display Magnet Mount + Pull Box tehter", AliExpress.com, first accessed on May 27, 2016; 2 pages.
VGuard, "vG-SDM004 Small Round Security Display Magnet Mount + Pull Box", WelGaurd.com, first accessed on May 27, 2016; 6 pages.
AnchorPad, "vRT Medium Retractable Tether with 29.5 Inch Cable for iPods & iPhones", Amazon.com, first accessed on May 27, 2016; 5 pages.
Maurerpe, "Wall Mount for Vtech 6419 Cordless Phone", MakerBot Thingiverse, Apr. 20, 2013; 6 pages.
Generic, "Television/Air Conditioner Remote Control Holder Wall Mount-Storage Box", Amazon.com, first accessed on May 27, 2016; 6 pages.
ZAZZ, "ZAZZ Wall Mount for iPad/Kindle and Tablets (Black)", Amazon.com, first accessed on May 27, 2016; 5 pages.
Plastic Sensor 2.0 Wall Mount Stand Holder for Zbox One Kinect 2.0—Black, Deal Extreme, DX.com, first accessed on May 28, 2016; 4 pages.
Sea-Dog, "Sea-Dog Removable Table Brackets—Stainless Steel", DownwindMarine.com, first accessed on May 28, 2016; 1 page.
Series Accessories: Developed for your Dynaudio loudspeakers, Dynaudio.com, first accessed on May 28, 2016; 6 pages.
Video Mount Products Vented Wall Mount Shelf, CableOrganizer.com, first accessed on May 28, 2016; 3 pages.
Cell Phone Wall Charger Adapter Charging Holder Flanging Support (2-Piece), first accessed on May 28, 2016; 2 pages.
Mid-Century Meets Modern: Gidloof Originals—Tiagosen, Design-Milk.com, Mar. 4, 2013; 14 pages.
Corner Bracket Levelers, 4 pack, Woodcraft.com, Woodcraft Supply LLC, first accessed on Jun. 29, 2016; 2 pages.
HighPoint Corner Bracket Levelers 4-piece, Woodcraft.com, Woodcraft Supply LLC, first accessed on Jun. 29, 2016; 2 pages.
Pack of 10 Heavy Duty Corner Braces 50mm Angle Bracket F Plate NEW, Ebay.com, White Hinge Ltd, first accessed on Jun. 29, 2016; 4 pages.
Screw-on Corner Braces, 4-Pack, Rockler.com, Rockler Woodworking and Hardware, first accessed on Jun. 29, 2016; 6 pages.
Glide Brackets and Systems, USFutaba.com, U.S. Futuba, Inc., first accessed on Jun. 29, 2016; 2 pages.
Corner Brace 2-1/2 x 2-1/2 x 3/4 in White Plastic, OvisOnline.com, OVIS division of WIM Corp, first accessed on Jun. 29, 2016; 4 pages.
"Inon Double Hole Rubber bushing (for fiber optic cable)," Backscatter.com, accessed on Apr. 25, 2017I 2 pages.
Redlinecarparts, "BMW 320D 99-06 Front Wishbone Bush with Bracket LH O," Ebay.com, accessed on Apr. 24, 2017; 5 pages.
Dardytrading, "Anti-lost Pull Box Anti Theft Recoiler Retracting Display Cable Retracting Security Cable Merchandise Security Tether Security Recoiler," DHGate.com, accessed on Apr. 24, 2017; 11 pages.
"Freedom Micro™," MobileTechnic.com, Mobile Technologies Inc., accessed on Apr. 24, 2017; 5 pages.
"Recent RTF News and Updates: Open display, retail smartphone security devices now produced in Brazil," RTFGlobal.com, accessed on Apr. 24, 2017; 3 pages.
Notice of Allowance in U.S. Appl. No. 29/566,596 dated Jan. 24, 2019; 14 pages.

* cited by examiner

MOBILE COMPUTING DEVICE HOLDER

CROSS REFERENCE TO RELATED APPLICATIONS

This application is a continuation-in-part of U.S. design patent application Ser. No. 29/566,596, filed Jun. 1, 2016 to Applicant Wal-Mart Stores Inc., and entitled "Wall Mount Fixture"; and this application claims priority to U.S. provisional patent application Ser. No. 62/343,952, filed Jun. 1, 2016 to Applicant Wal-Mart Stores Inc., and entitled "Coupling Apparatus", U.S. provisional patent application Ser. No. 62/343,953, filed Jun. 1, 2016 to Applicant Wal-Mart Stores Inc., and entitled "Wall Mount Fixture", and to U.S. provisional patent application Ser. No. 62/343,954, filed Jun. 1, 2016 to Applicant Wal-Mart Stores Inc., and entitled "Mobile Computing Device Holder", all of which are incorporated herein by reference in their entirety.

BACKGROUND OF THE INVENTION

Technical Field

This invention relates to fixtures for holding mobile computing devices, and specifically to a mobile computing device holder that mounts to a wall and holds a mobile computing device base and a mobile computing device.

State of the Art

Mobile computing devices such as cellular telephones, personal computing devices, electronic scanner devices, tablets and other computing devices are in common use by individuals and businesses. These mobile computing devices are lightweight and easily carried by a person from one place to another. Mobile computing devices often have a base or charger unit that holds the mobile computing device when the mobile computing device is not being used. The base or charger unit holds, stores, and often charges the mobile computing device. In some situations, it is desirable to mount the base or charger unit to a wall so the mobile computing device is easily accessible. In specific situations, it is desirable to keep a mobile computing device in one location so the mobile computing device can be used by one or more individuals, but the individuals cannot remove the mobile computing device from the location. In these instances, it is desirable to tether the mobile computing device to a fixture so the mobile computing device cannot be moved from the desired location. Mobile computing devices do not usually have loops or couplers that can be used to tether the mobile computing device. Accordingly, it is desirable to have a holder for holding the mobile computing device and the mobile computing device base that is easily mounted to a wall, that is easy to mount the mobile computing device base to, and is easily constructed. It is also desirable to have a coupling apparatus that can be mounted to the mobile computing device to be used to tether the mobile computing device to the holder.

DETAILED DESCRIPTION OF EMBODIMENTS OF THE INVENTION

As discussed above, embodiments of the disclosed invention relate to fixtures for holding mobile computing devices, and specifically to a mobile computing device holder that mounts to a wall and holds a mobile computing device base and a mobile computing device.

Disclosed is a mobile computing device holder that mounts to a wall. The mobile computing device holder holds a mobile computing device base, such as a docking station or charger. A mobile computing device, such as a smart phone or scanner device, for example but not by way of limitation, is cradled by the mobile computing device base. The combination of the mobile computing device holder and the mobile computing device provides a mobile computing device that can be used, but does not allow the mobile computing device to be moved very far from the mobile computing device holder. The mobile computing device holder includes a wall mount fixture that mounts to the wall and holds the mobile computing device base. The mobile computing device holder also includes a coupling apparatus that is coupled to the mobile computing device, and a tether device coupled to both the wall mount fixture and the coupling apparatus. The tether device tethers the mobile computing device and coupling apparatus to the wall mount fixture so the mobile computing device can be used, but cannot be moved more than the length of the tethering device from the wall mount fixture.

The disclosed mobile computing device holder includes a means to hold a mobile computing device base, and a means to couple a mobile computing device to the means to hold the mobile computing device base. The means to hold the mobile computing device is coupled to a wall. In some embodiments, the means to hold the mobile computing device base is a means to support the mobile computing device base. In some embodiments, the means to hold the mobile computing device base is a means to support the mobile computing device base and the mobile computing device. In some embodiments, the means to couple the means to hold the mobile computing device base to a wall is a means to removeably couple the means to hold the mobile computing device base to a wall. In some embodiments, the means to couple the mobile computing device to the means to hold the mobile computing device base is retractable.

Figure 1:
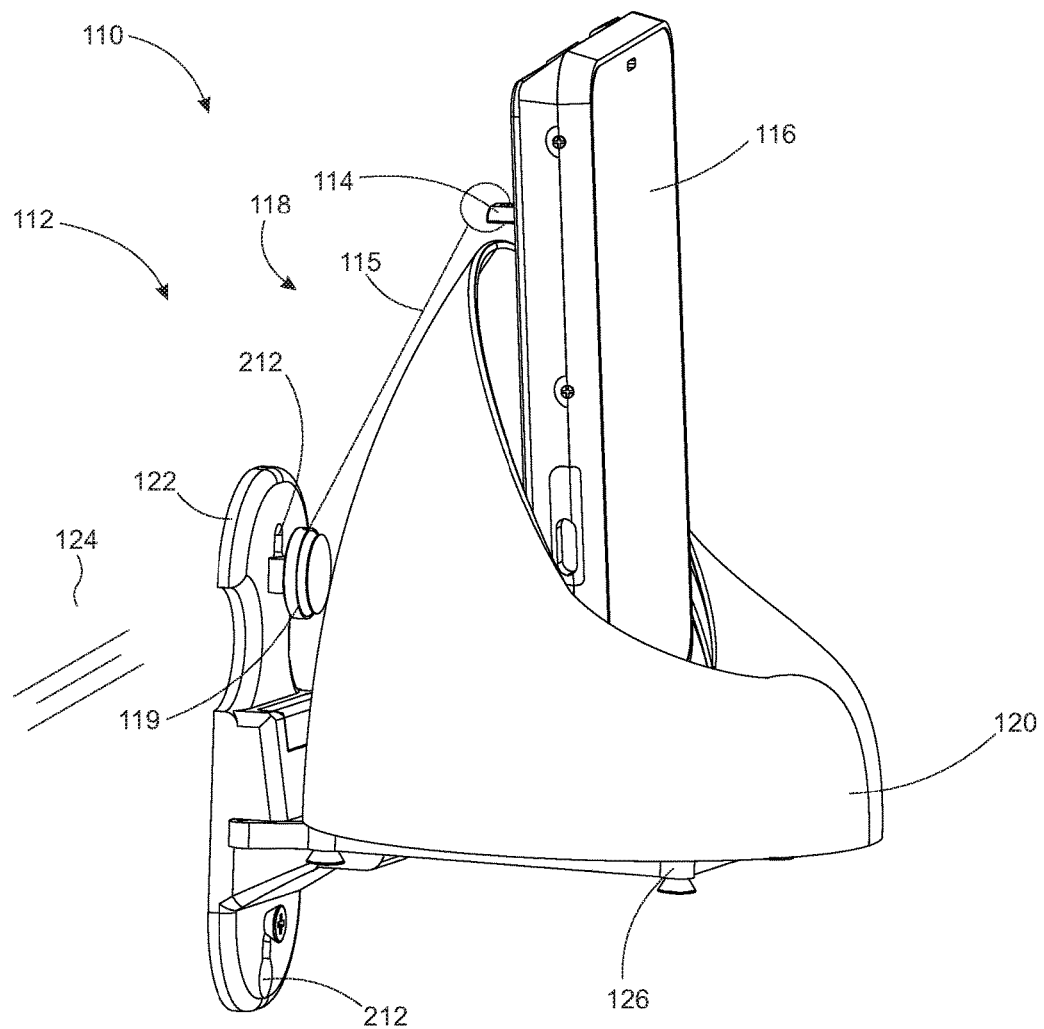
FIG. 1 shows a side perspective view of a wall mount fixture supporting a mobile computing device base and a mobile computing device.
Figure 2:
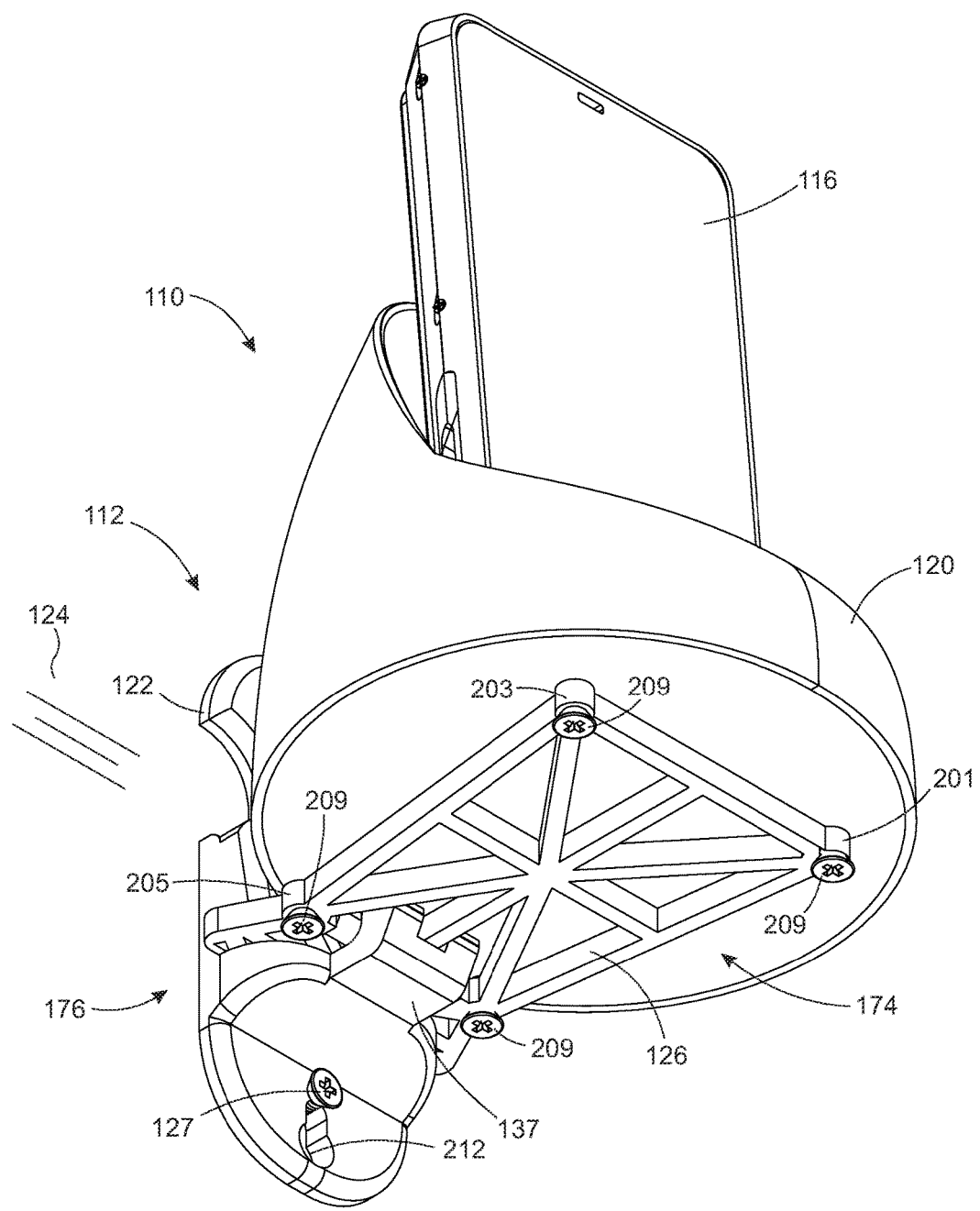
FIG. 2 shows a bottom perspective view of the wall mount fixture of FIG. 1 supporting the mobile computing device base and the mobile computing device.
Figure 3:
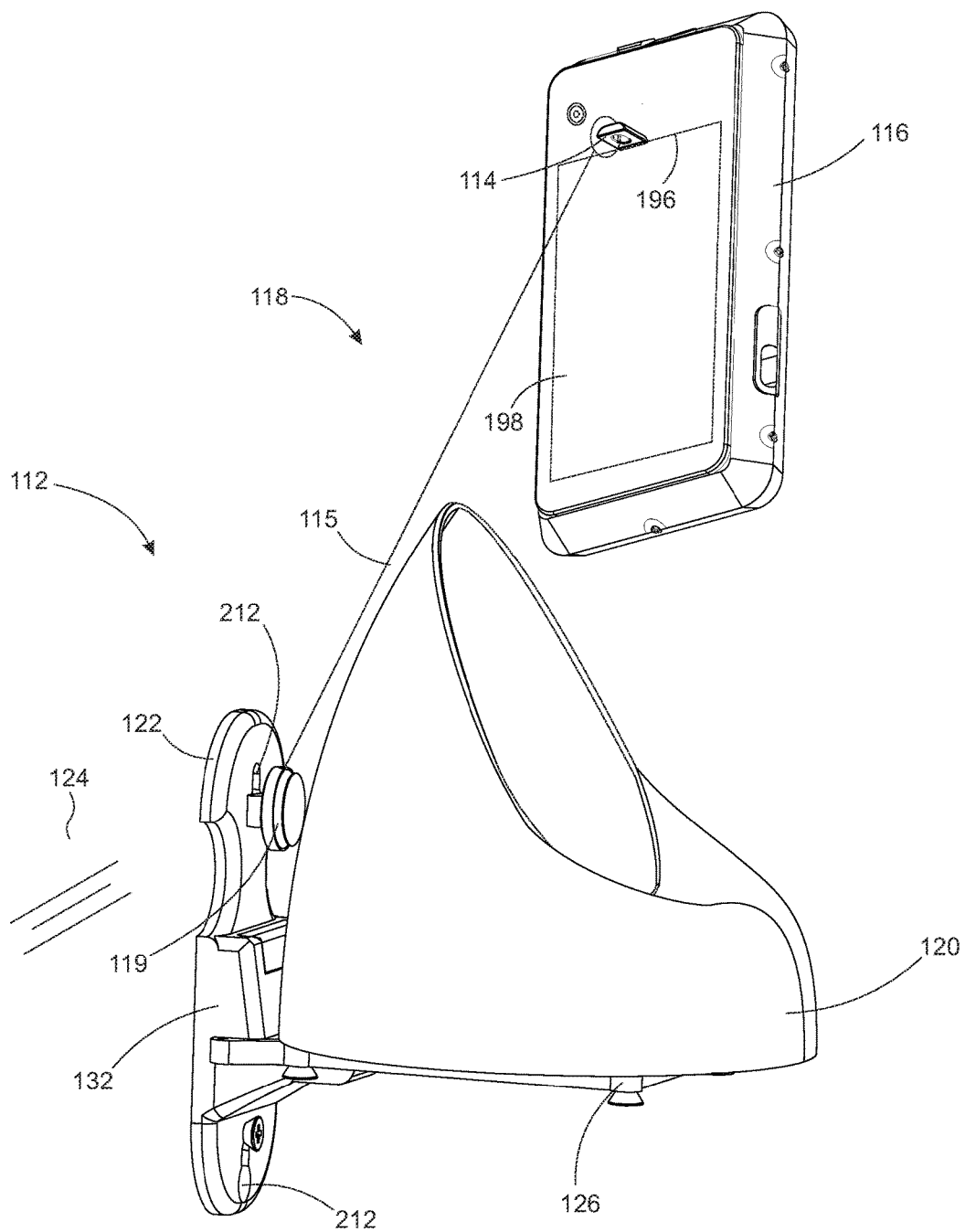
FIG. 3 shows a side perspective view of the mobile computing device holder of FIG. 1 with the mobile computing device removed from the mobile computing device base.

FIG. 1, FIG. 2, and FIG. 3 show a combination of a mobile computing device holder 110 and a mobile computing device 116. Mobile computing device holder 110 is holding a mobile computing device base 120 and mobile computing device 116. FIG. 1 shows a top perspective view of mobile computing device holder 110 supporting mobile computing device base 120 and mobile computing device 116. FIG. 2 shows a bottom perspective view of mobile computing device holder 110 supporting mobile computing device base 120 and mobile computing device 116. FIG. 3 shows a side perspective view of mobile computing device holder 110 with mobile computing device 116 removed from the mobile computing device base 120. Mobile computing device 116 can be any type of device with a computer processor, such as a mobile communicator, a cellular phone, a smart phone, a tablet device, a scanning device, or any other type of mobile computing device. Mobile computing device base 120 can be any type of holder, charger, or cradle for mobile computing device 116.

Mobile computing device holder 110 includes a wall mount fixture 112. Wall mount fixture 112 supports mobile computing device base 120 and mobile computing device 116 so that it is convenient and easy to remove mobile computing device 116 from mobile computing device base 120. Wall mount fixture 112 is coupled to a wall 124. In this embodiment, wall mount fixture 112 is a means to hold mobile computing device base 120. Mobile computing device base 120 cradles mobile computing device 116. In some embodiments, mobile computing device base 120 is a charger. In some embodiments, mobile computing device base 120 is a docking station for mobile computing device 116.

Mobile computing device holder 110 also includes a coupling apparatus 114 coupled to mobile computing device 116. In this embodiment, coupling apparatus 114 is coupled to a rear surface of mobile computing device 116, as can be seen in FIG. 1 and FIG. 3. Mobile computing device holder 110 also includes a tether device 118 that couples to both wall mount fixture 112 and coupling apparatus 114. Tether device 118 tethers mobile computing device 116 to wall mount fixture 112 so that mobile computing device is prevented from moving too far from wall mount fixture 112. In this embodiment, tether device 118 is a means to couple mobile computing device 116 to the means to hold mobile computing device base 120.

Figure 4:
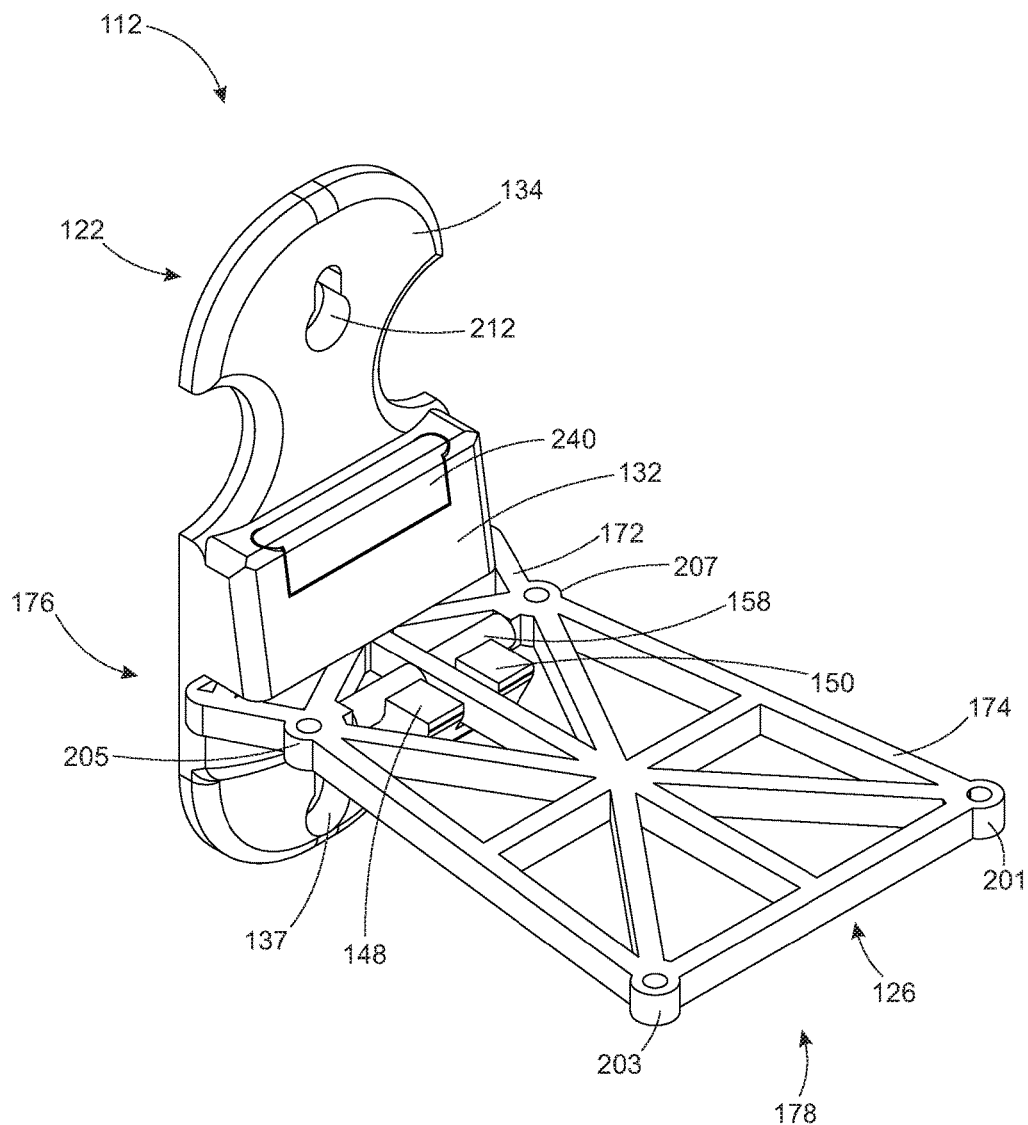
FIG. 4 shows a front perspective view of a wall mount fixture.
Figure 5:
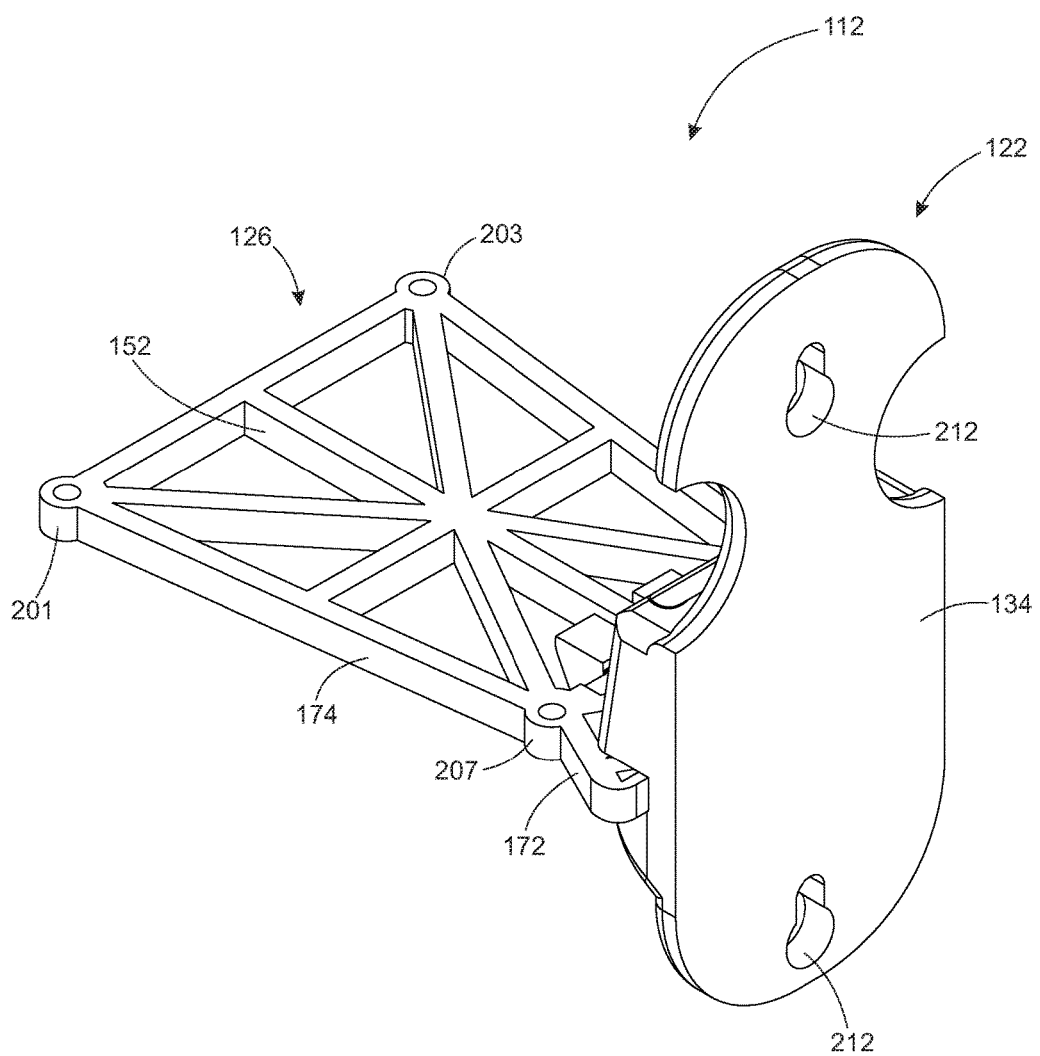
FIG. 5 shows a rear perspective view of the wall mount fixture of FIG. 4.
Figure 6:
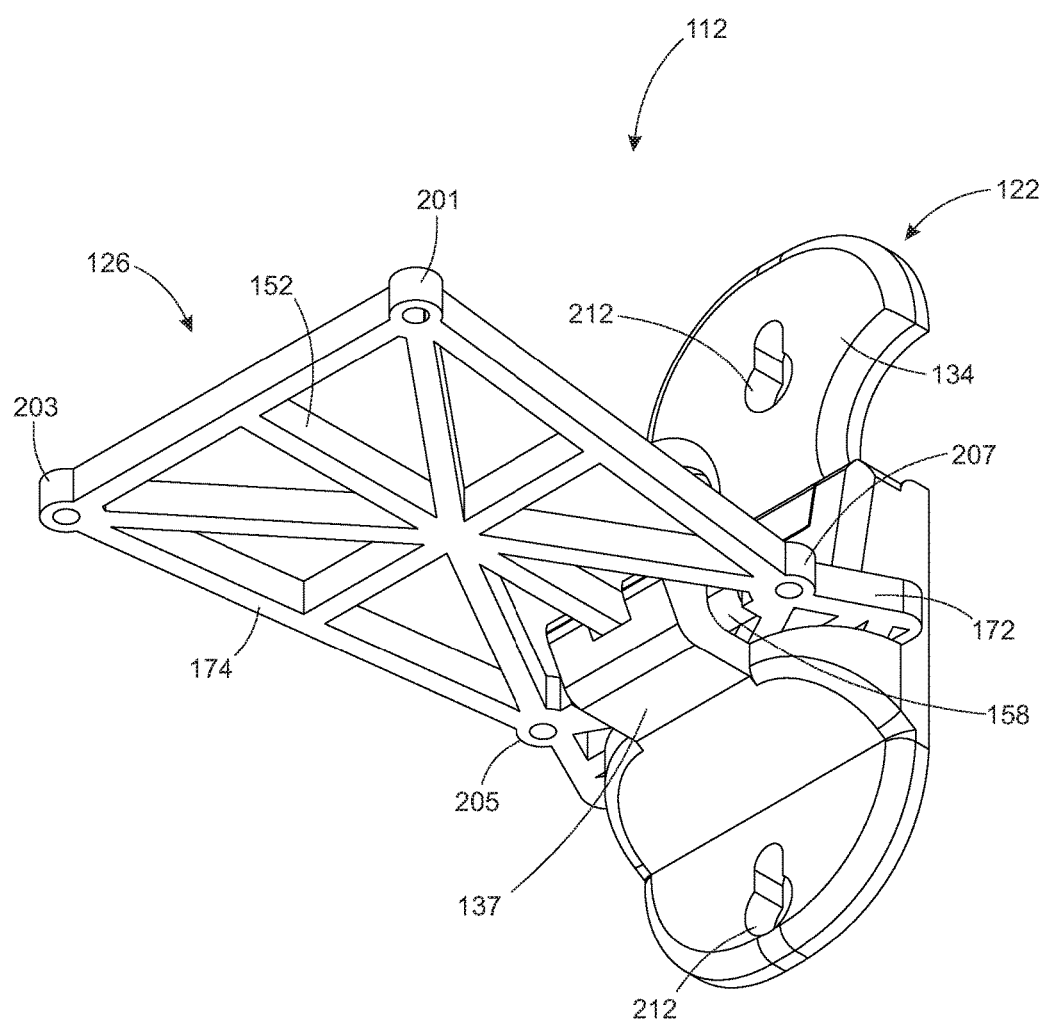
FIG. 6 shows a bottom perspective view of the wall mount fixture of FIG. 4.
Figure 7:
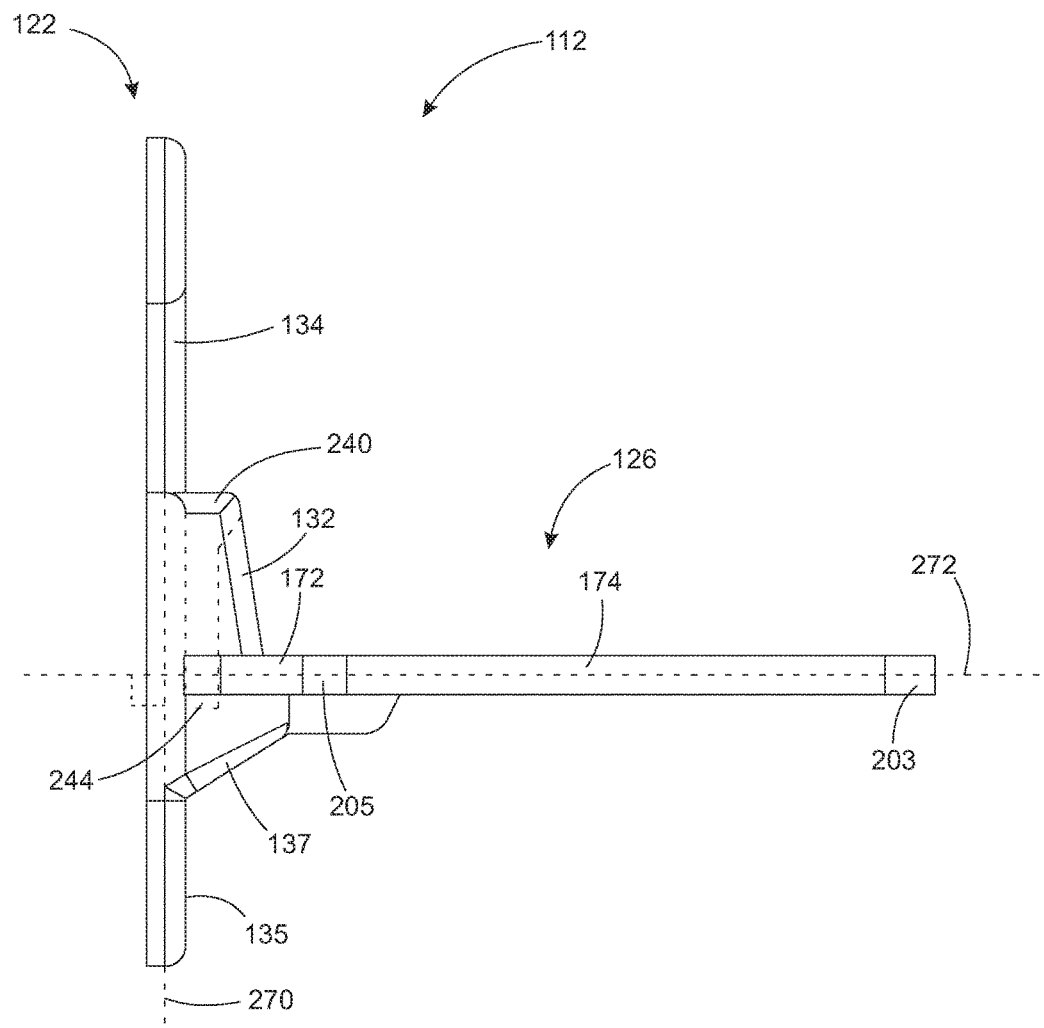
FIG. 7 shows a side view of the wall mount fixture of FIG. 4.
Figure 8:
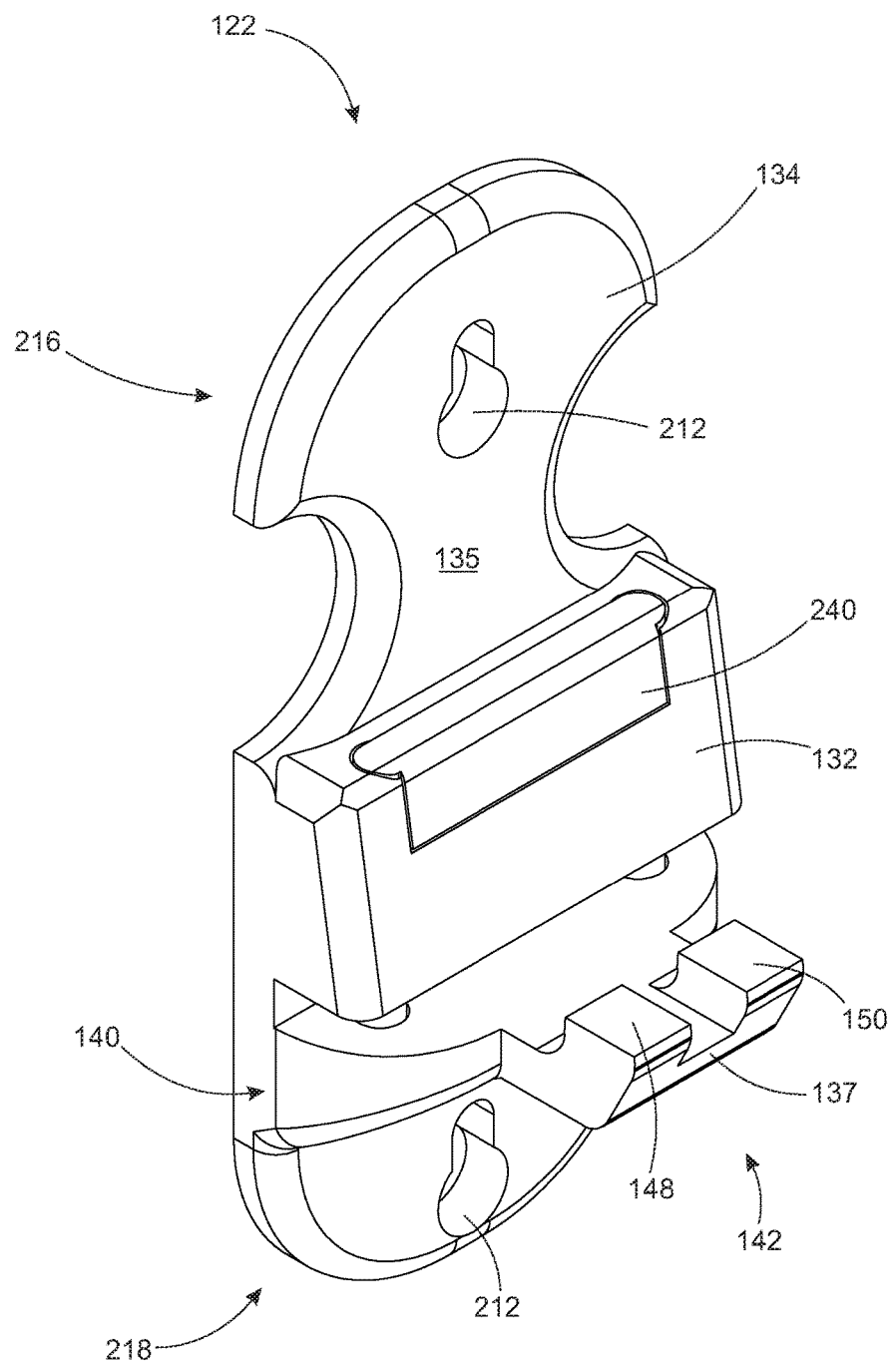
FIG. 8 shows a perspective view of a wall bracket of a wall mount fixture.
Figure 9:
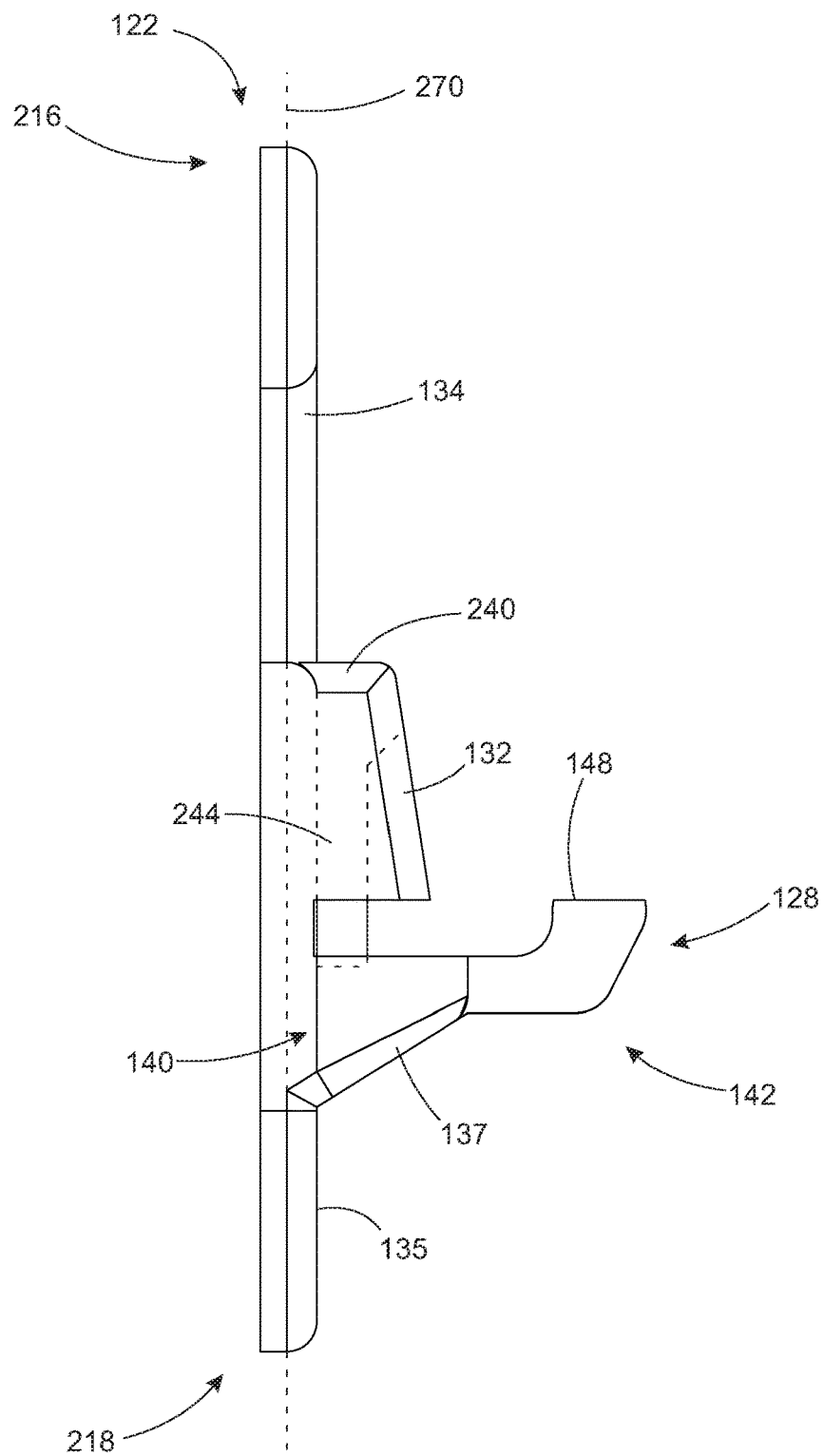
FIG. 9 shows a side view of the wall bracket of FIG. 8.
Figure 10:
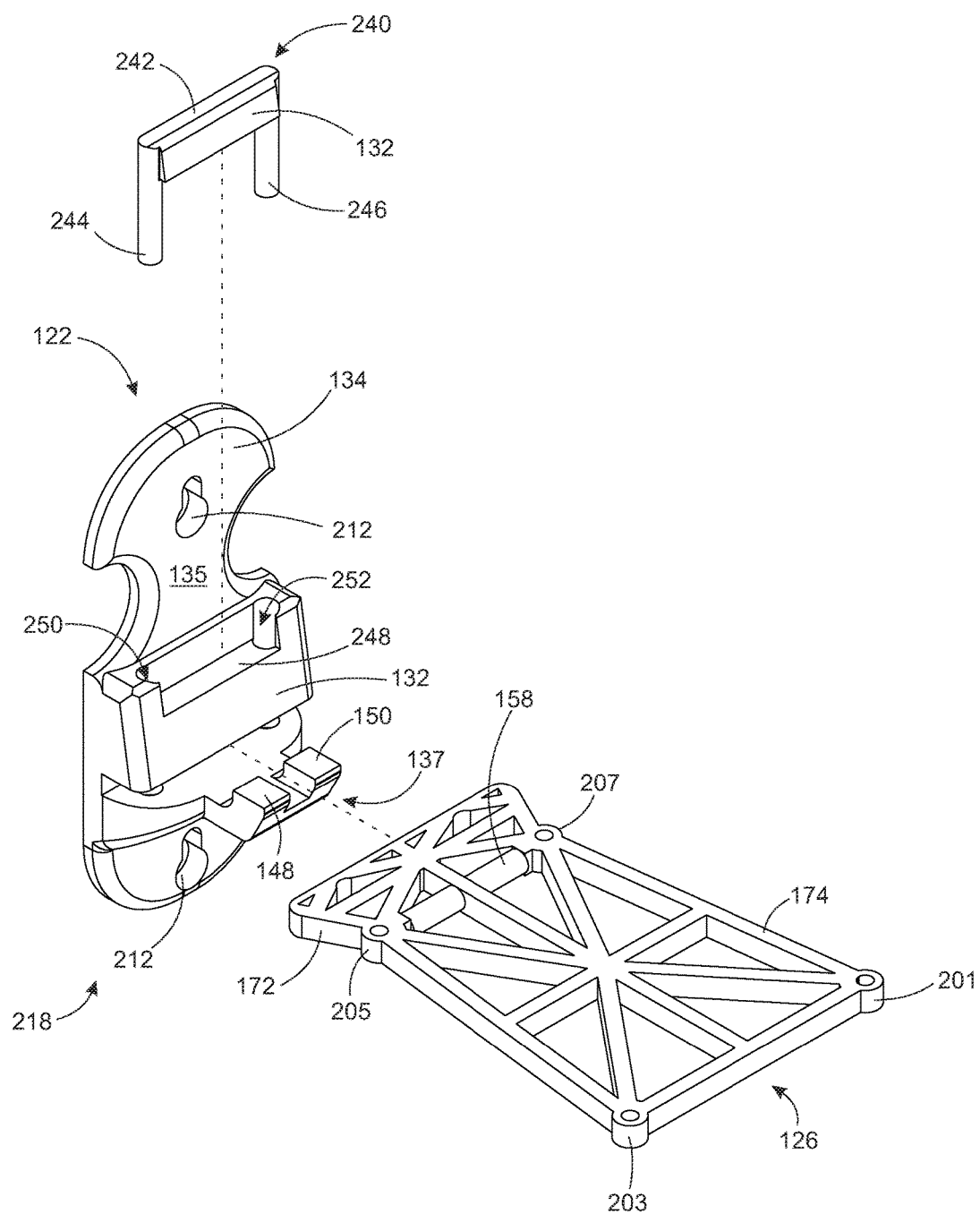
FIG. 10 shows an exploded view of the wall mount fixture of FIG. 4.
Figure 11:
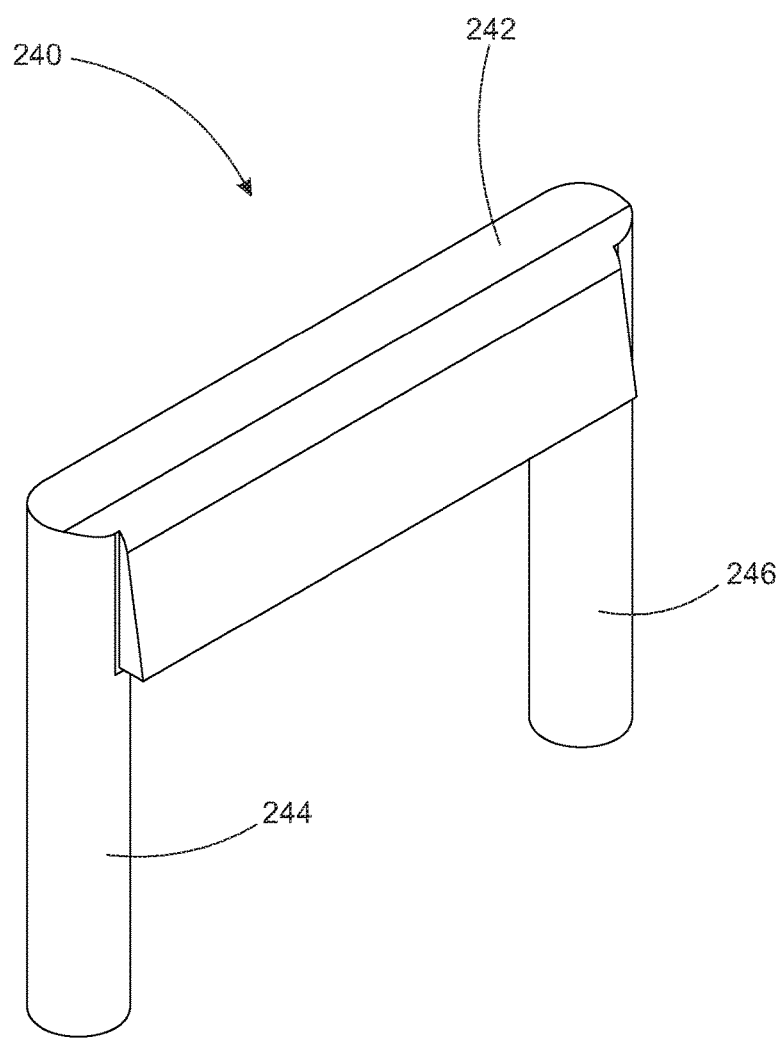
FIG. 11 shows a perspective view of a locking device.
Figure 12:
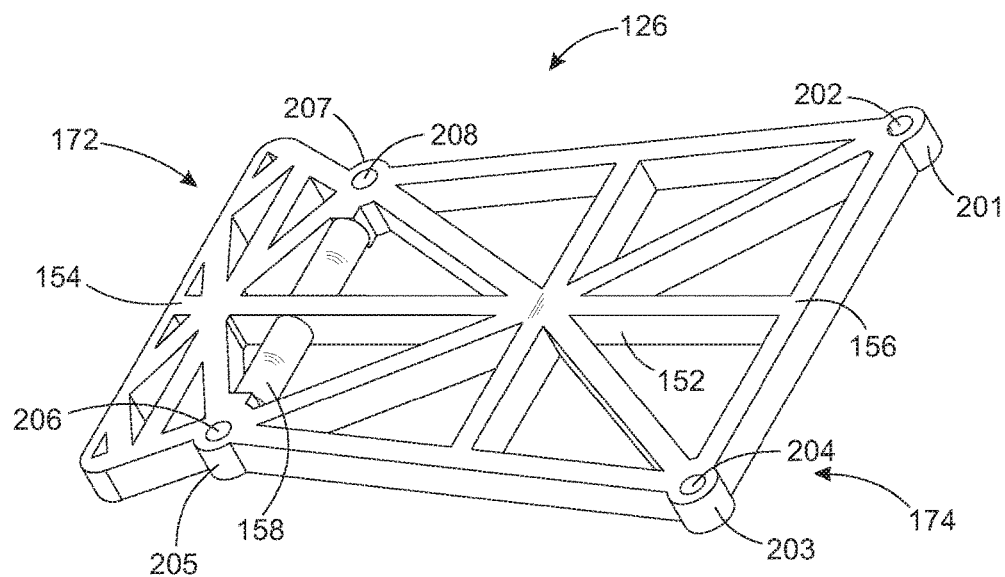
FIG. 12 shows a perspective view of a base bracket of a wall mount fixture.
Figure 13:
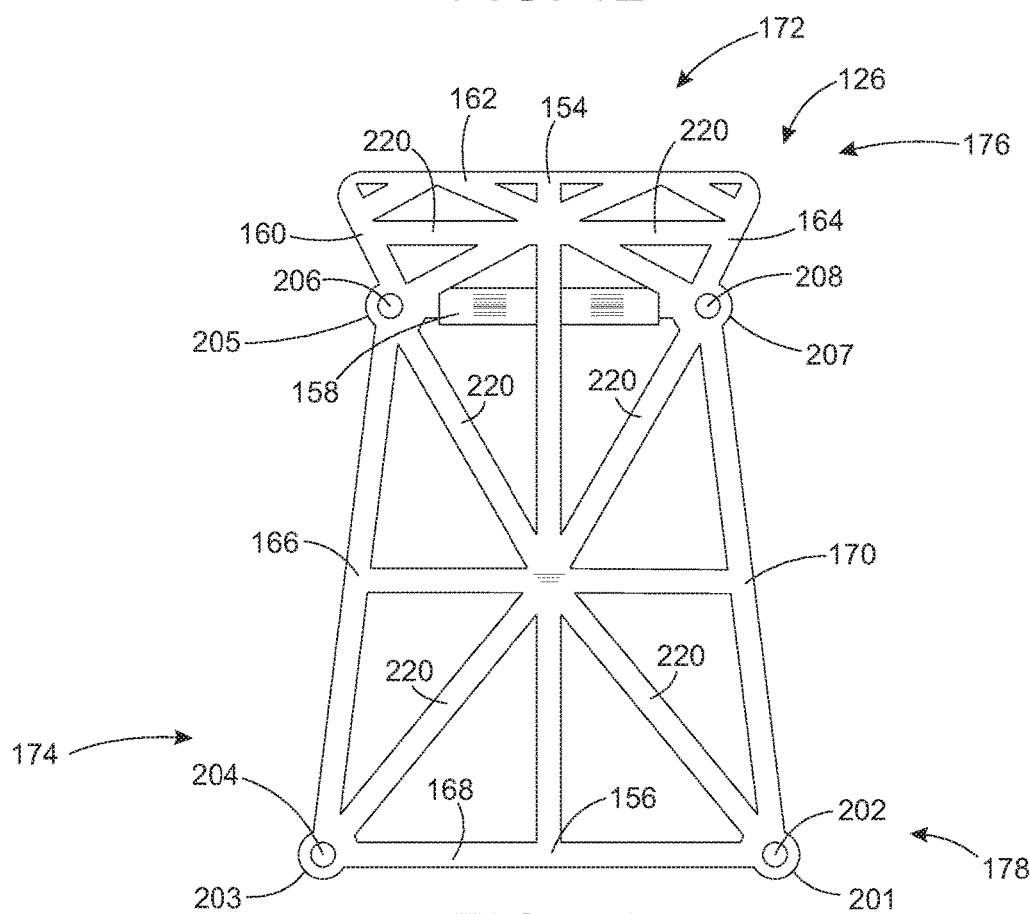
FIG. 13 shows a top view of the base bracket of FIG. 12.

FIG. 4 through FIG. 13 show details of wall mount fixture 112. FIG. 4 shows a front perspective view of wall mount fixture 112. FIG. 5 shows a rear perspective view of wall mount fixture 112. FIG. 6 shows a bottom perspective view of wall mount fixture 112. FIG. 7 shows a side view of wall mount fixture 112. FIG. 8 shows a perspective view of a wall bracket 122 of wall mount fixture 112. FIG. 9 shows a side view of wall bracket 122. FIG. 10 shows an exploded view of wall mount fixture 112. FIG. 11 shows a perspective view of a locking device 240 of wall mount fixture 112. FIG. 12 shows a perspective view of a base bracket 126 of wall mount fixture 112. FIG. 13 shows a top view of base bracket 126.

Wall mount fixture 112 includes wall bracket 122 and base bracket 126. Wall bracket 122 is the portion of wall mount fixture 112 that is coupled to a wall. In the embodiment shown in FIG. 1 and FIG. 2, wall bracket 122 is coupled to wall 124. Wall bracket 122 is the means to couple the means to hold mobile computing device base 120 to a wall. In this embodiment, wall bracket 122 is a means to removeably couple the means to hold the mobile computing device base 120 to a wall because wall bracket 122 can be removeably coupled to wall 124 using coupler holes 212 (FIG. 1, FIG. 2, and FIG. 3) and coupler 127, which in this embodiment is a screw.

Base bracket 126 is coupled to wall bracket 122, as shown in FIG. 1 through FIG. 7 and FIG. 10. In this embodiment, base bracket 126 is removeably coupled to wall bracket 122. In this embodiment base bracket 126 being removeably coupled to wall bracket 122 is another means to removeably couple the means to hold mobile computing device base 120 to a wall. Base bracket 126 is shown in FIGS. 12 and 13 and described in detail below.

Wall bracket 122 includes a spine portion 134, a bracket support arm 137, and a locking device 240. Spine portion 134 is mounted flush to wall 124 using coupler holes 212 and couplers 127 (FIG. 1 through FIG. 3), for example, but not by way of limitation. Bracket support arm 137 supports base bracket 126, as shown in FIG. 4, FIG. 6, and FIG. 7. Locking device 240 locks base bracket 126 to wall bracket 122, as can best be seen in FIG. 7 and FIG. 10. Wall bracket 122 has a wall bracket longitudinal axis 270, as shown in FIG. 7 and FIG. 9.

Spine portion 134 is shown in FIG. 8 and FIG. 9. Spine portion 134 includes a first end 216 and a second end 218. In this embodiment, spine portion 134 includes two coupler holes 212, one at first end 216 and one at second end 218. Coupler holes 212 are used to couple spine portion 134 to wall 124. Wall bracket longitudinal axis 270 extends longitudinally through spine portion 134 from first end 216 to second end 218, as shown in FIG. 7 and FIG. 9. Spine portion 134 includes a lip 132 that extends from front surface 135 of spine portion 134. Lip 132 is a protrusion from spine portion 134 that holds base bracket 126 in place on bracket support arm 137. Base bracket 126 has a distal portion 174 that couples to and supports mobile computing device base 120, as shown in FIG. 2, FIG. 12, and FIG. 13. And base bracket 126 has a proximal portion 172 that slips under lip 132 to help couple base bracket 126 to spine 134, as can best be seen in FIG. 4 and FIG. 7. Lip 132 extends from spine portion 134 approximately halfway between first end 216 and second end 218.

Bracket support arm 137 supports base bracket 126. Base bracket 126 sets on bracket support arm 137, as shown in FIG. 2, FIG. 6 and FIG. 7. Bracket support arm 137 extends from front surface 135 of spine portion 134 between lip 132 and second end 218, with just enough room between lip 132 and bracket support arm 137 to slip proximal frame portion 172 of base bracket 126 between lip 132 and bracket support arm 137. Bracket support arm 137 has a bracket support arm proximal end 140 coupled to spine portion 134, and a bracket support arm distal end 142 that opposes bracket support arm proximal end 140 and supports base bracket 126. Bracket support arm 137 has a first and a second bracket support pad 148 and 150 at bracket support arm distal end 142, as can best be seen in FIG. 4, FIG. 8, and FIG. 9, First and second bracket support pads 148 and 158 partially encircle a common side rail 158 of base bracket 126 to help couple base bracket 126 to wall bracket 122

Locking device 240 is shown in detail in FIG. 10 and FIG. 11. Locking device 240 is a U-shaped device that is inset into a pin cutout 248 of lip 132. Locking device 240 is used to lock base bracket 126 to wall bracket 122. Locking device 240 is removeably coupled to lip 132 of spine portion 134 in pin cutout 248 of lip 132. Locking device 240 has a rigid backbone 242, with a first pin 244 and a second pin 246 extending perpendicularly from rigid backbone 242. Pin cutout 248 includes a first pin hole 250 and a second pin hole 252, as shown in FIG. 10. Locking device 240 is inserted into pin cutout 248 such that first pin 244 extends through first pin hole 250, and second pin 246 extends through second pin hole 252, as best seen in FIG. 7 and FIG. 9. Once base bracket 126 is inserted between lip 132 and bracket support arm 137, locking device 240 is inserted into pin cutout 248. With locking device 240 inserted into pin cutout 248, first and second pin 244 and 246 extend through proximal frame portion 172 of base bracket 126 and into bracket support arm 137, as best seen in FIG. 7, FIG. 9, and FIG. 10. First and second pin 244 and 246 lock base bracket 126 to wall bracket 122. To remove base bracket 126 from wall bracket 122, locking pin 240 is removed from lip 132, and base bracket 126 is tilted and lifted off of bracket support arm 37 and away from wall bracket 122.

Base bracket 126 is coupled to wall bracket 122 and holds mobile computing device base 120. Base bracket 126 has a base bracket longitudinal axis 272, as shown in FIG. 7. When base bracket 126 is coupled to wall bracket 122, base bracket longitudinal axis 272 is approximately perpendicular to wall bracket longitudinal axis 270, as shown in FIG. 7. Base bracket 126 includes proximal frame portion 172 and distal frame portion 174, as shown in FIG. 12 and FIG. 13. Proximal frame portion 172 is a rectangular-shaped frame structure with four side rails, including a proximal frame first side rail 160, a proximal frame second side rail 162, a proximal frame third side rail 164, and a proximal frame fourth side rail, which is called a common side rail 158 because this side rail is common to both proximal frame portion 172 and distal frame portion 174. Proximal frame portion 172 also includes a number of support rails 220 that extend between side rails 160, 162, 164, and 158. Support rails 120 act as braces to give base bracket 126 rigidity and support.

Distal frame portion 174 is a rectangular-shaped frame structure with four side rails, including a distal frame first side rail 166, a distal frame second side rail 168, a distal frame third side rail 170, and a distal frame fourth side rail, which is the common side rail 158 common to both proximal frame portion 172 and distal frame portion 174. Distal frame portion 172 also includes a number of support rails 220 that extend between side rails 166, 168, 170, and 158 to give base bracket 126 rigidity and support.

Base bracket 126 also includes a longitudinal support rail 152 (best seen in FIG. 12 and FIG. 13). Longitudinal support rail 152 extends longitudinally through base bracket 126 from a base bracket proximal end 176 to a base bracket distal end 178, as shown in FIG. 13. Longitudinal support rail 152 has a first end 154 coupled to proximal frame portion 172 second side rail 162. Longitudinal support rail 152 has a second end 156 coupled to distal frame portion 174 second side rail 168. Longitudinal support rail 152 extends through, and is coupled to, common side rail 158, as shown in FIG. 12 and FIG. 13. Longitudinal support rail 152 gives base bracket 126 rigidity, strength, and support.

Base bracket 126 also includes a distal frame portion first corner 201 with a first hole 202, a distal frame portion second corner 203 with a second hole 204, a distal frame portion third corner 205 with a third hole 206, and a distal frame portion fourth corner 207 with a fourth hole 208.

Holes 202, 204, 206, and 208 are used to couple mobile computing device base 120 to base bracket 126, as shown in FIG. 2. Screws 209 are extended through each of holes 202, 204, 206, and 208 and into mobile computing device base 220. Screws 209 couple mobile computing device 120 to base bracket 126. In some embodiments, other coupling means and methods are used to couple mobile computing device base 120 to base bracket 126. In this embodiment, base bracket 126 is the means to hold and support mobile computing device base 120.

Once wall bracket 122 is coupled to wall 124, and mobile computing device base 120 is coupled to base bracket 126, base bracket 126 is removeably coupled to wall bracket 122. Base bracket 126 is removeably coupled to wall bracket 122 by removing locking device 240 from spine portion 134, inserting proximal end 176 under lip 132, and setting common rail 158 on bracket support arm 137, then inserting locking device 240 into pin cutout 248 so that first and second pin 244 and 246 extend through base bracket 126 and lock base bracket 126 to wall bracket 122, as can best be seen in FIG. 4, FIG. 6, FIG. 7, and FIG. 10. Common side rail 158 is supported by bracket support arm 137. Base bracket 126 is easy to remove from wall bracket 122. Base bracket 126 and mobile computing device base 120 can be easily and repeatably removed from wall bracket 122 by removing locking pin 240 from wall bracket 122, tipping base bracket 126 up, off of bracket support arm 137, and sliding proximal end 176 out from under lip 132. Base bracket 126 is easily disconnected from wall bracket 122, without disconnecting mobile computing device base 120 from base bracket 126. This allows base bracket 126, mobile computing device 116, and mobile computing device base 120 to be removed from wall bracket 122 and used or carried until it is desirable to re-couple base bracket 126 to wall bracket 122.

Base bracket 126 supports mobile computing device base 120 and mobile computing device 116, and wall bracket 122 couples base bracket 126 to wall 124. Thus, wall mount fixture 112 supports and holds mobile computing device base 120 and mobile computing device 116.

Figure 14:
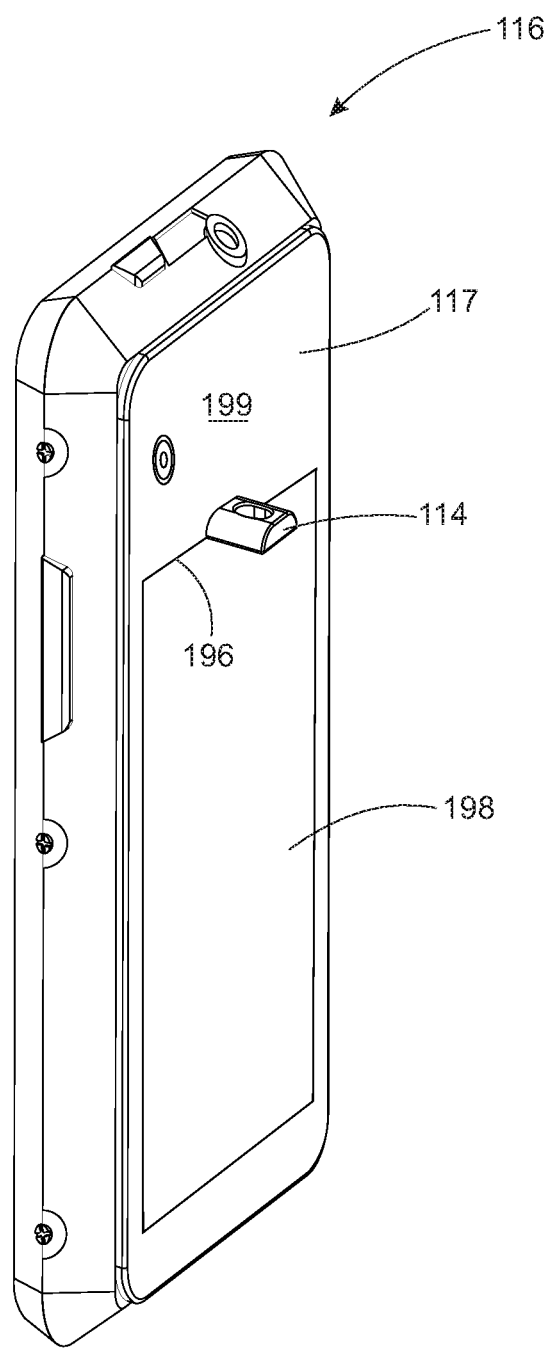
FIG. 14 shows a rear perspective view of a coupling apparatus coupled to a mobile computing device.
Figure 15:
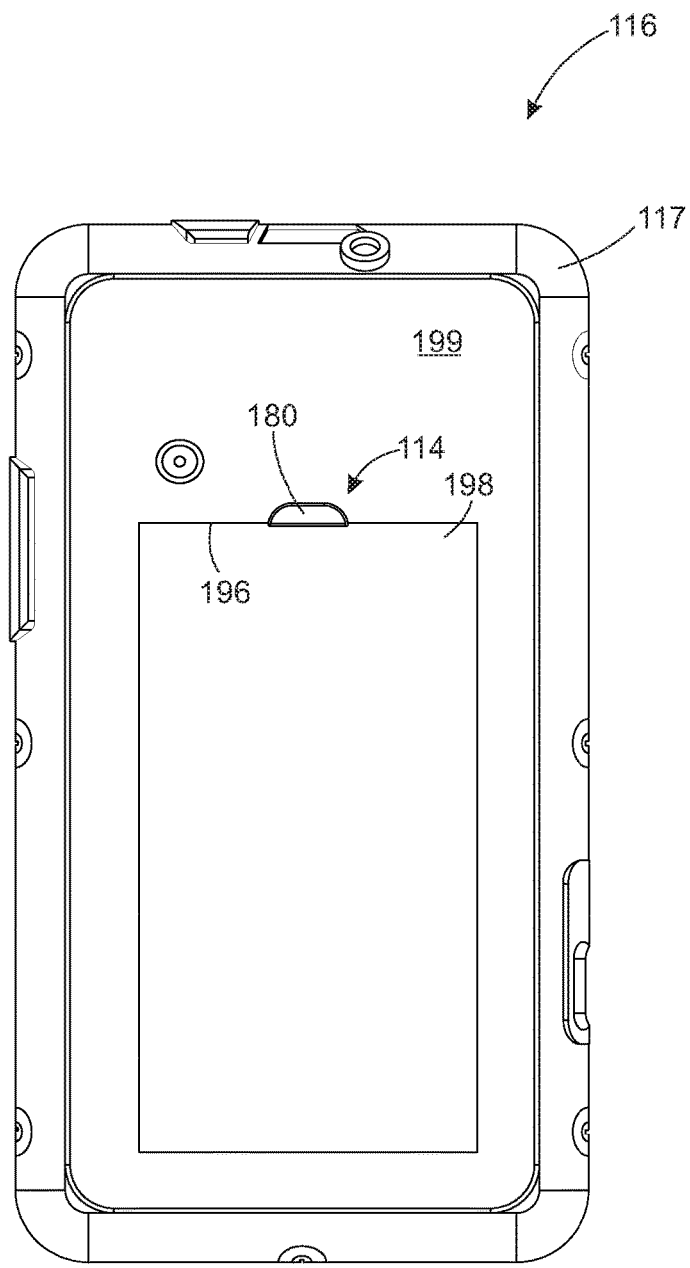
FIG. 15 shows a rear view of the coupling apparatus coupled to a mobile computing device of FIG. 14.
Figure 16:
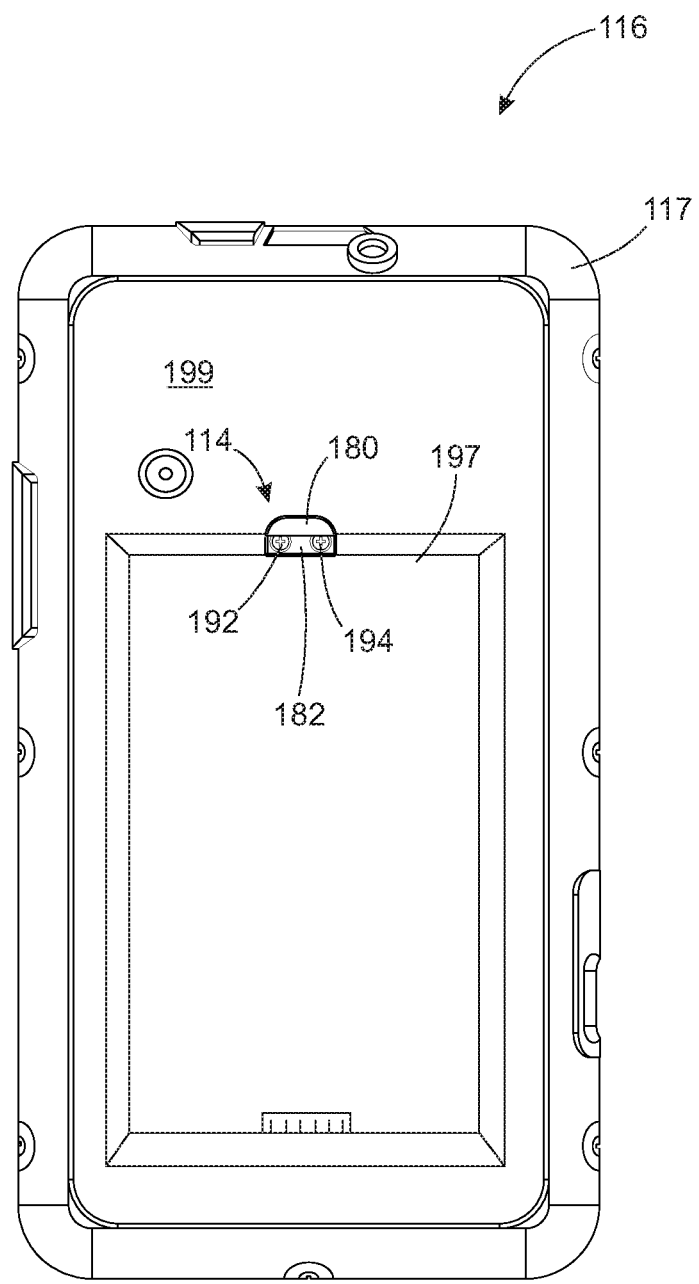
FIG. 16 shows a rear view of the coupling apparatus coupled to a mobile computing device of FIG. 14, with a battery compartment lid of the mobile computing device removed, showing the coupling apparatus coupled to the battery compartment.

FIG. 14 through FIG. 21 show details of coupling apparatus 114. FIG. 14 through FIG. 16 show an embodiment of coupling apparatus 114 coupled to mobile computing device 116. FIG. 14 shows a front perspective view of coupling apparatus 114 coupled to mobile computing device 116. FIG. 15 shows a rear perspective view of coupling apparatus 114 coupled to mobile computing device 116. FIG. 16 shows a rear perspective view of coupling apparatus 114 coupled to mobile computing device 116 with a battery compartment 197 of mobile computing device 116 opened, showing how first and second screw 192 and 194 are used to couple coupling apparatus 114 to mobile computing device 116. Coupling apparatus 114 is coupled to tether device 118 as shown in FIG. 1 and FIG. 3 to tether mobile computing device 116 to wall mount fixture 112.

Figure 17:
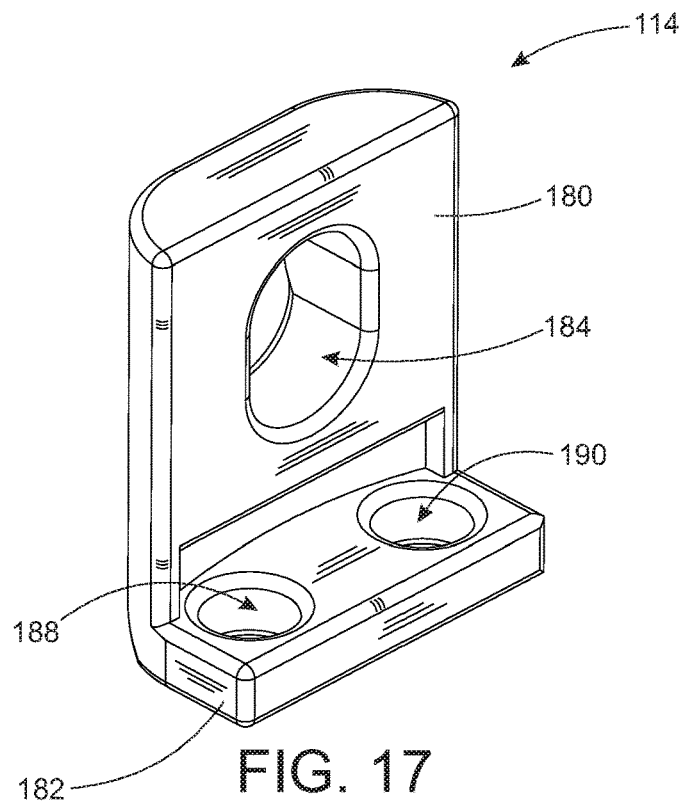
FIG. 17 shows a front perspective view of a coupling apparatus.
Figure 18:
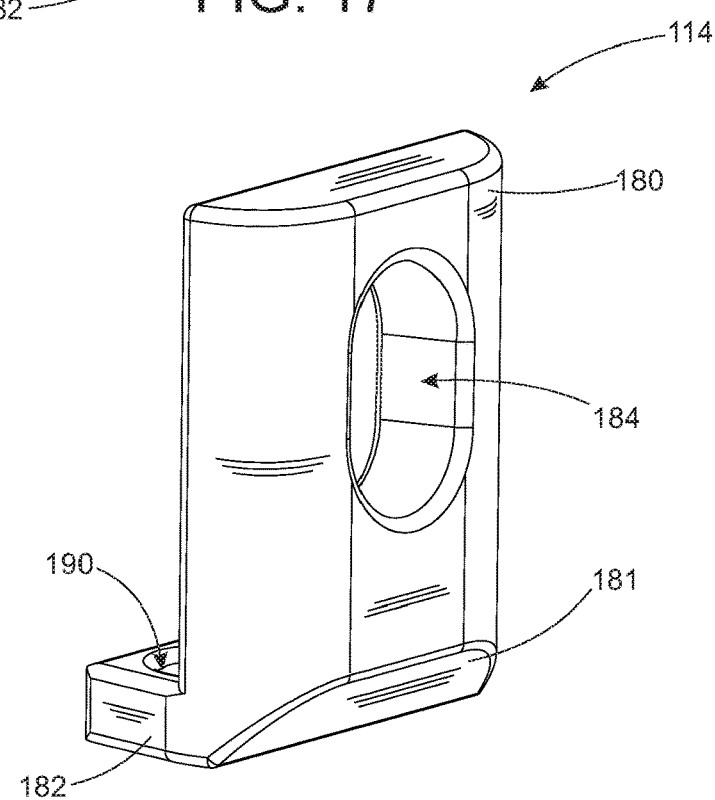
FIG. 18 shows a rear perspective view of the coupling apparatus of FIG. 17.
Figure 19:
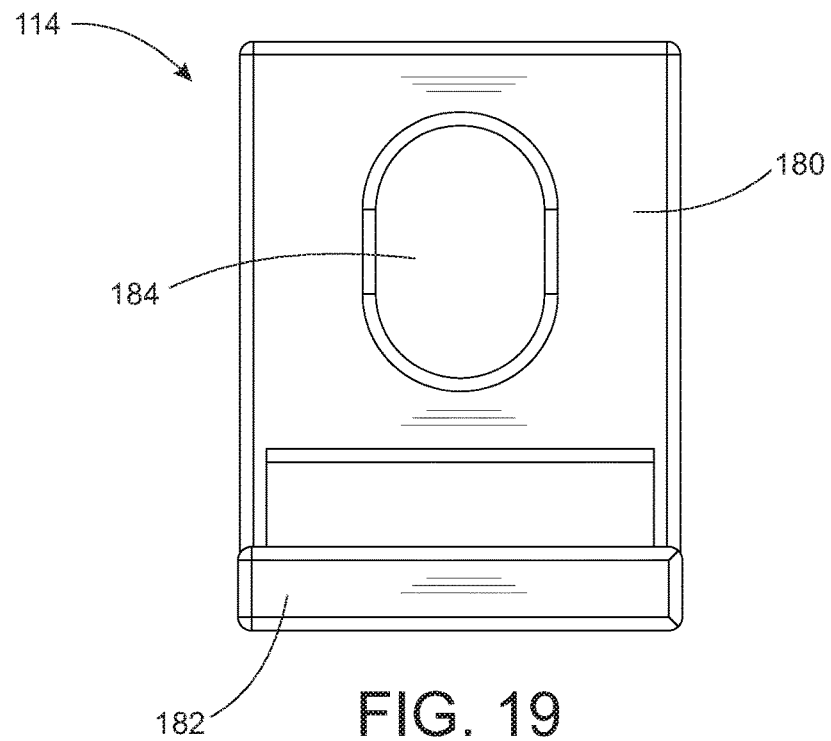
FIG. 19 shows a front view of the coupling apparatus of FIG. 17.
Figure 20:
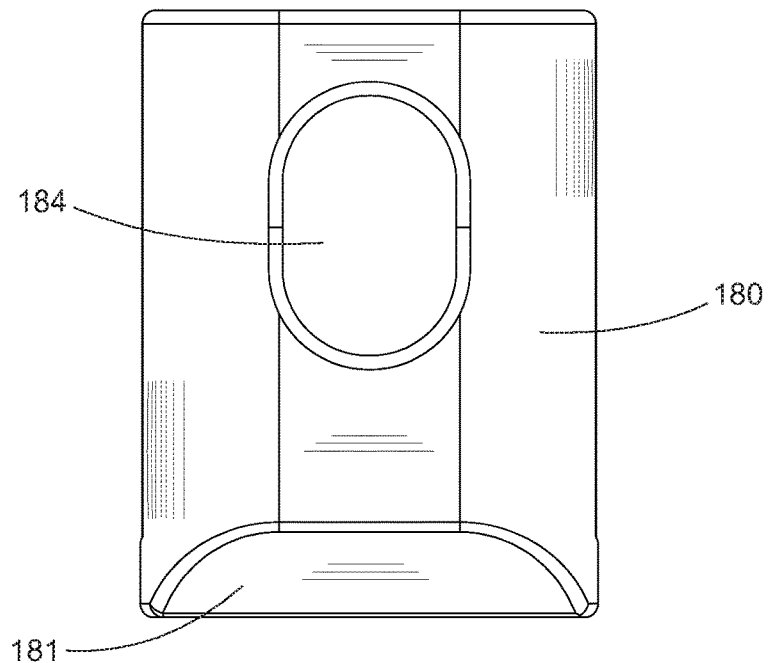
FIG. 20 shows a rear view of the coupling apparatus of FIG. 17.
Figure 21:
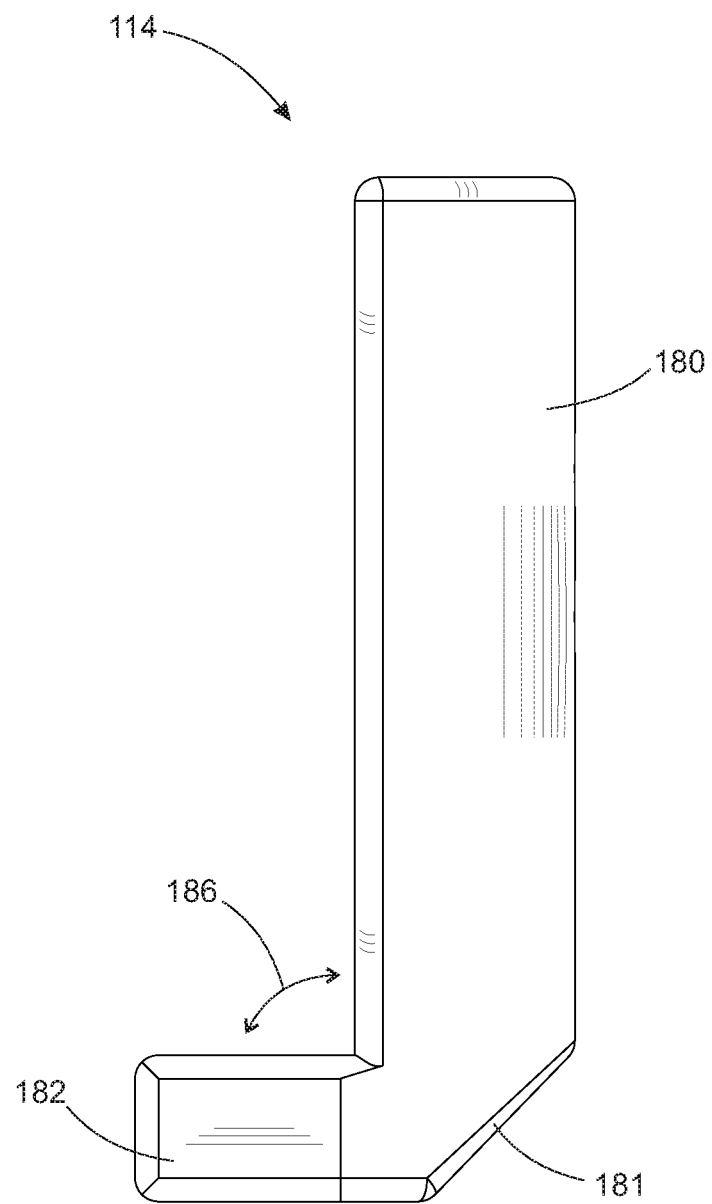
FIG. 21 shows a side view of the coupling apparatus of FIG. 17.

FIG. 17 through FIG. 21 show views of coupling apparatus 114. FIG. 17 shows a front perspective view of coupling apparatus 114. FIG. 18 shows a rear perspective view of coupling apparatus 114. FIG. 19 shows a front view of coupling apparatus 114. FIG. 20 shows a rear view of coupling apparatus 114. FIG. 21 shows a side view of coupling apparatus 114.

Coupling apparatus 114 includes a loop plate 180 and a coupler plate 182 coupled to loop plate 180. Loop plate 180 includes a hole 184 through loop plate 180. Hole 184 is coupled to a cord 115 of tether device 118, as best seen in FIG. 3. In this embodiment, hole 184 is oval shaped, but this is not meant to be limiting. Hole 184 can be round shaped, rectangular shaped, or any other shape that is desirable for coupling purposes. In this embodiment, loop plate 180 has rounded edges, but this is not meant to be limiting. In some embodiments, loop plate 180 does not have rounded edges. In this embodiment, loop plate 180 has a beveled edge 181, as can be seen in FIG. 18, FIG. 20, and FIG. 21, but this is not meant to be limiting. In some embodiments, loop plate 180 does not have a beveled edge 181.

Loop plate 180 extends from mobile computing device 116 in response to coupling apparatus 114 being coupled to mobile computing device 116, as shown in FIG. 1, FIG. 3, and FIG. 14 through FIG. 16. In this embodiment, loop plate 180 extends approximately perpendicularly to a rear surface 199 of a housing 117 of mobile computing device116, as can best be seen in FIG. 3 and FIG. 14. In some embodiments, however, loop plate 180 extends at an angle other than 90 degrees from housing 117.

In the embodiment shown the figures, coupling apparatus 114 is coupled to the inside of a battery compartment 197 of mobile computing device 116. In this embodiment, loop plate 180 extends from mobile computing device 116 in response to coupler plate 182 of coupling apparatus 180 being coupled to battery compartment 197. Coupling apparatus 114 is coupled to battery compartment 197 such that loop plate 180 extends from housing 117 of mobile computing device 116 through a seam 196 between housing 117 of mobile computing device 116 and a battery compartment lid 198, as shown in FIG. 3, FIG. 14, FIG. 15, and FIG. 16. Coupling apparatus 114 is coupled to battery compartment 197 as shown in FIG. 16, and then battery compartment lid 198 is installed such that loop plate 180 extends from seam 196. Beveled edge 181 helps loop plate 180 fit through seam 196 and helps battery compartment lid 198 fit securely once coupling apparatus 114 is attached to mobile computing device 114.

It is to be understood that coupling apparatus 114 can be coupled to mobile computing device 116 in many different ways and positions on mobile computing device 116, and that the coupling location and method shown is not meant to be limiting. In this embodiment, coupled plate 182 is detachably coupled to mobile computing device 116, but this is not meant to be limiting. Coupler plate 182 can be configured to be coupled to mobile computing device 116 in many different ways. In some embodiments, coupler plate 182 includes at least one screw hole, and coupler plate 182 is coupled to mobile computing device 116 by extending a screw through the at least one screw hole and into housing 117 of mobile computing device 116.

In the embodiment shown, coupler plate 182 is configured to be coupled to mobile computing device 116 using a first and a second screw hole 188 and 190 in coupler plate 182, as shown in FIG. 16 and FIG. 17. First screw 192 extends through first screw hole 188 and into housing 117 of mobile computing device 116. Second screw 194 extends through second screw hole 190 and into housing 117 of mobile computing device 116. In this embodiment, screws 192 and 194 are screwed into an edge of battery compartment 197 of housing 117, as shown in FIG. 16, so that loop plate 180 extends through seam 196 once battery compartment lid 198 is coupled to housing 117. In some embodiments, coupled plate 182 is configured to be coupled to mobile computing device 116 using other coupling means, and/or in other locations on mobile computing device 116.

In the embodiment shown, coupler plate 182 is coupled to loop plate 180 such that an angle 186 between coupler plate 182 and loop plate 180 (FIG. 21) is about 90 degrees. Angle 186 of about 90 degrees helps direct loop plate 180 through seam 196 and helps battery compartment lid 198 fit on housing 117 once coupling apparatus 114 is coupled to housing 117. In some embodiments, angle 186 between coupler plate 182 and loop plate 180 is different than 90 degrees. In some embodiments, angle 186 between coupler plate 182 and loop plate 180 is between about 80 and about 100 degrees. Angle 186 of between 80 and 100 degrees helps coupling apparatus 114 conform to other geometries and configurations of mobile computing device 117.

Coupling apparatus 114 and wall mount fixture 112 are coupled together using tether device 118, as shown in FIG. 1 and FIG. 3. Tether device 118 tethers mobile computing device 116 to wall mount fixture 112. Tether device 118 is coupled to wall mount fixture 112, and tether device 118 is coupled to coupling apparatus 114, which is coupled to mobile computing device 116. In this embodiment tether device 118 is retractable, but this is not meant to be limiting. In some embodiments, tether device is not retractable. In some embodiments tether device 118 is a cord or a string or a wire or a strap.

Tether device 118, in the embodiments shown in the figures, includes a cord 115 that is coupled to coupling apparatus 114, and a reel 119 that is coupled to wall mount fixture 112 (FIG. 1 and FIG. 3). Cord 115 winds onto reel 119 so that mobile computing device 116 can be removed from mobile computing device base 120 and used, but mobile computing device 116 cannot be moved any further from wall mount fixture 112 than the length of cord 115. In this embodiment, cord 115 retracts onto reel 119 so that cord 115 is kept neat and does not get tangled. Tether device 118 prevents loss or theft of mobile computing device 116, for example.

Wall fixture 112 couples mobile computing device base 120 and mobile computing device 116 to a wall 124. Coupling apparatus 114 couples mobile computing device 116 to tether 118. Tether 118 couples coupling apparatus 114 and mobile computing device 116 to wall mount fixture 112. Thus, mobile computing device holder 110 holds mobile computing device base 120 and mobile computing device 116, and keeps mobile computing device from being removed very far from wall mount fixture 122.

Figure 22:
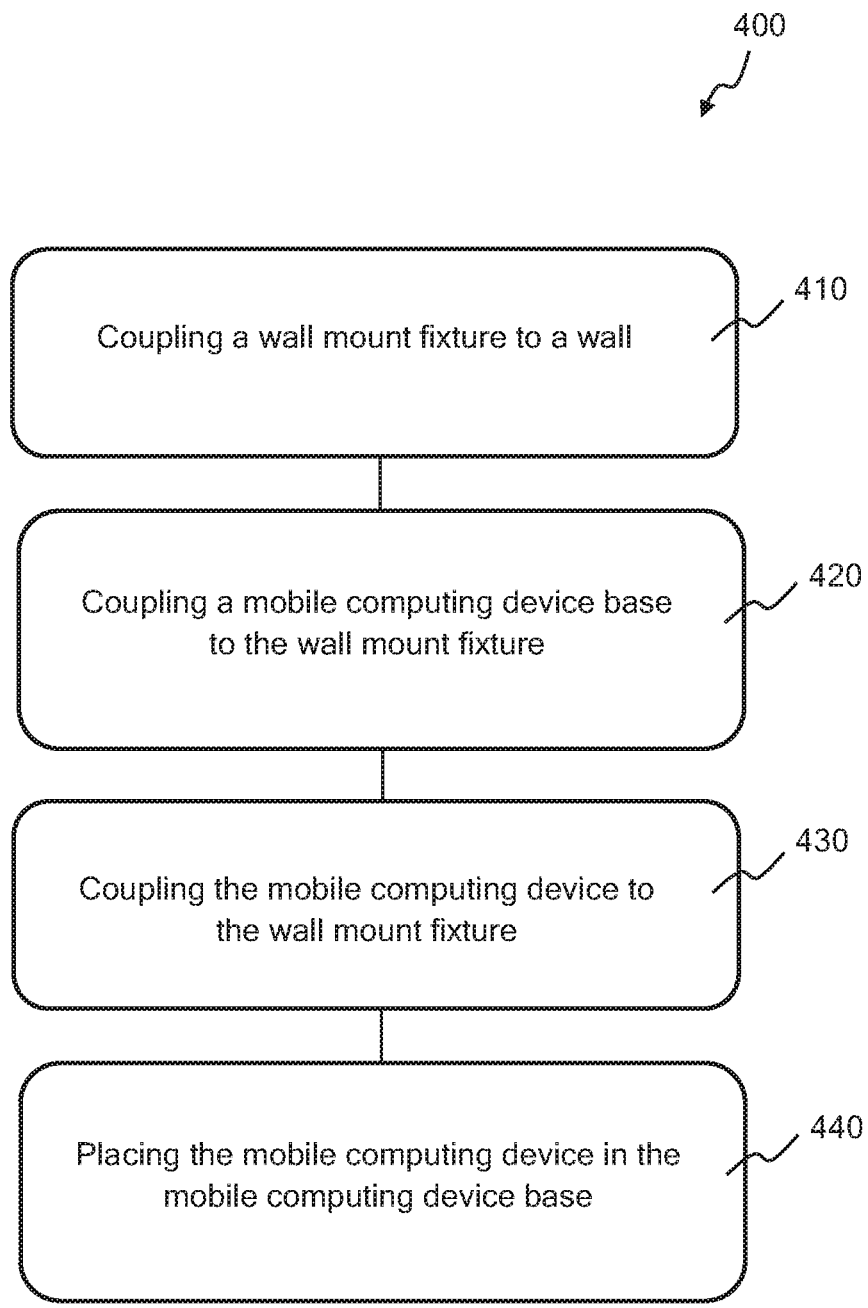
FIG. 22 illustrates a method of holding a mobile computing device.

FIG. 22 illustrates a method 400 of holding a mobile computing device. Method 400 includes an act 410 of coupling a wall mount fixture to a wall. The wall mount fixture can be coupled to the wall in many ways. In some embodiments, coupling the wall mount fixture to the wall includes an act of coupling a wall bracket to the wall. In some embodiments, coupling the wall mount fixture to the wall includes coupling a base bracket to the wall bracket. In some embodiments coupling the base bracket to the wall bracket includes sliding a locking device into a pin cutout in the wall bracket, wherein a first and a second pin of the locking device extend through the base bracket to lock the base bracket to the wall bracket.

Method 400 includes an act 420 of coupling a mobile computing device base to the wall mount fixture. In some embodiments, coupling the mobile computing device base to the wall mount fixture includes coupling the mobile computing device base to the base bracket.

Method 400 includes an act 430 of coupling the mobile computing device to the wall mount fixture. In some embodiments, coupling the mobile computing device to the wall mount fixture includes coupling a coupling apparatus to the mobile computing device. In some embodiments, coupling the mobile computing device to the wall mount fixture includes coupling the coupling apparatus to the wall mount fixture with a retractable cord. In some embodiments, coupling the coupling apparatus to the mobile computing device includes coupling the coupling apparatus to the inside of a battery compartment of the mobile computing device such that a lopp plate of the coupling apparatus extends through a seam between a housing and a battery compartment lid of the mobile computing device.

Method 400 includes an act 440 of placing the mobile computing device in the mobile computing device base. In some embodiments, the mobile computing device base is a mobile computing device charger. Method 400 can include many other acts.

In some embodiments, coupling the mobile computing device to the wall mount fixture includes coupling the mobile computing device to the wall mount fixture with a cord. In some embodiments, coupling the mobile computing device to the wall mount fixture includes retractably coupling the mobile computing device to the wall mount fixture.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A combination mobile computing device holder and mobile computing device, the combination comprising:
   a wall mount fixture comprising:
      a wall bracket, wherein the wall bracket is coupled to a wall; and
      a base bracket, wherein the base bracket is coupled to the wall bracket;
   a coupling apparatus, wherein the coupling apparatus is coupled to the mobile computing device,
   and wherein the coupling apparatus comprises:
      a loop plate, wherein the loop plate comprises a hole through the loop plate; and
      a coupler plate perpendicularly coupled to the loop plate, wherein the coupler plate couples to the mobile computing device;
   wherein the loop plate extends from the mobile computing device through a seam between a housing and a battery compartment lid of the mobile computing device in response to the coupler plate being coupled to the mobile computing device; and
   a tether device coupled to both the wall mount fixture and the coupling apparatus, wherein the tether device couples the coupling apparatus to the wall mount fixture.

2. The combination of claim 1, wherein the base bracket is removeably coupled to the wall bracket.

3. The combination of claim 1, further comprising a mobile computing device base coupled to the base bracket, wherein the mobile computing device is cradled by the mobile computing device base.

4. The combination of claim 3, wherein the wall bracket comprises:
   a spine portion, wherein the spine portion mounts flush to the wall;
   a bracket support arm, wherein the bracket support arm supports the base bracket; and
   a locking device, wherein the locking device locks the base bracket to the wall bracket.

5. The combination of claim 4, wherein the mobile computing device base is a mobile computing device charger.

6. The combination of claim 1, wherein the tether device comprises a retractable cord.

7. A wall mount fixture for holding a mobile computing device base, the wall mount fixture comprising: a wall bracket having a wall bracket longitudinal axis, wherein the wall bracket is configured to be coupled to a wall, and a base bracket having a base bracket longitudinal axis, wherein the base bracket is removeably coupled to the wall bracket, and wherein the wall bracket longitudinal axis is perpendicular to the base bracket longitudinal axis, and wherein the base bracket is configured to hold the mobile computing device base, wherein the wall bracket comprises: a spine portion configured to mount flush to the wall; a locking device, wherein the locking device is removeably coupled to the spine portion, and wherein the locking device locks the base bracket to the spine portion, and a bracket support arm extending from the spine portion, wherein the bracket support arm supports the base bracket, wherein the base bracket comprises: a proximal frame portion, wherein the proximal frame portion is rectangular shaped; and a distal frame portion coupled to the proximal frame portion, wherein the distal frame portion is rectangular shaped; wherein the proximal frame portion and the distal frame portion share a common side rail; wherein the bracket support arm supports the common side rail; wherein the locking device comprises: a rigid backbone; and a first and a second pin extending perpendicularly from the rigid backbone; and wherein the first and the second pin extend through the proximal frame portion in response to coupling the locking device to the spine portion.

* * * * *